(12) United States Patent
Patel et al.

(10) Patent No.: US 8,308,217 B2
(45) Date of Patent: Nov. 13, 2012

(54) AUTOMOBILE SUN VISOR WITH ELECTROMECHANICAL SUN SHADE AND METHODS OF USE THEREOF

(76) Inventors: Rameshbhai Kalabhai Patel, Surat (IN); Manishkumar Rameshbhai Patel, Surat (IN); Prashantkumar Rameshbhai Patel, Orlando, FL (US)

( * ) Notice: Subject to any disclaimer, the term of this patent is extended or adjusted under 35 U.S.C. 154(b) by 382 days.

(21) Appl. No.: 12/555,089

(22) Filed: Sep. 8, 2009

(65) Prior Publication Data
US 2010/0060028 A1    Mar. 11, 2010

Related U.S. Application Data

(60) Provisional application No. 61/191,495, filed on Sep. 8, 2008.

(51) Int. Cl.
*B60J 1/20* (2006.01)
(52) U.S. Cl. ............... 296/97.1; 296/97.8; 160/370.22
(58) Field of Classification Search ............... 296/97.1, 296/97.2, 97.7, 97.8, 97.13, 97.4; 160/90, 160/370.22
See application file for complete search history.

(56) References Cited

U.S. PATENT DOCUMENTS

| | | | |
|---|---|---|---|
| 14,243 A | 2/1856 | Keehnold | |
| 1,442,255 A * | 1/1923 | Doner | 296/97.8 |
| 2,815,978 A * | 12/1957 | Sandberg | 296/97.2 |
| 4,836,263 A | 6/1989 | Ament | |
| 4,979,775 A | 12/1990 | Klose | |
| 5,042,866 A | 8/1991 | Cody | |
| 5,076,633 A | 12/1991 | Hsu et al. | |
| 5,085,473 A | 2/1992 | Yang | |
| 5,291,934 A | 3/1994 | Ouvrard et al. | |
| 5,344,206 A | 9/1994 | Middleton | |
| 5,468,040 A * | 11/1995 | Peng Hsieh et al. | 296/97.4 |
| 5,653,278 A * | 8/1997 | Cheng | 160/370.22 |
| 5,751,488 A | 5/1998 | Wade | |
| 5,752,560 A | 5/1998 | Cherng | |
| 5,947,544 A | 9/1999 | Hubeshi | |
| 6,032,718 A | 3/2000 | Chen | |
| 6,135,192 A | 10/2000 | Suzuki et al. | |
| 6,422,291 B1 | 7/2002 | Brunnert et al. | |
| 6,457,508 B1 | 10/2002 | Tomita | |
| 6,557,616 B2 | 5/2003 | Schlect | |
| 6,668,902 B2 | 12/2003 | Bong | |
| 7,320,493 B2 * | 1/2008 | Kumakawa et al. | 296/97.8 |
| 2006/0082184 A1 * | 4/2006 | Lee | 296/97.1 |
| 2009/0032202 A1 * | 2/2009 | Grindle | 160/90 |

FOREIGN PATENT DOCUMENTS
EP          421899 A    *   4/1991
* cited by examiner

*Primary Examiner* — Glenn Dayoan
*Assistant Examiner* — Pinel Romain
(74) *Attorney, Agent, or Firm* — John V. Stewart

(57) ABSTRACT

An automobile sun visor with an electromechanical sun shade device preferably comprising an elongated housing with a generally tear-shaped profile that is adapted for pivotally-adjustable installation at essentially any location proximate the interior roof of a vehicle and that attractively accommodates all necessary elements of the device therewithin, a scissor-type extension mechanism with interdependent, multi-stage frame support layers that evenly and supportively extend and adjust to a plurality of lengths, a two-layer screening system that surrounds the extension mechanism on all sides via a releasable connector, and that is adapted for preferential variation of interior versus exterior display during deployment, and a motorized control system with guide elements.

16 Claims, 21 Drawing Sheets

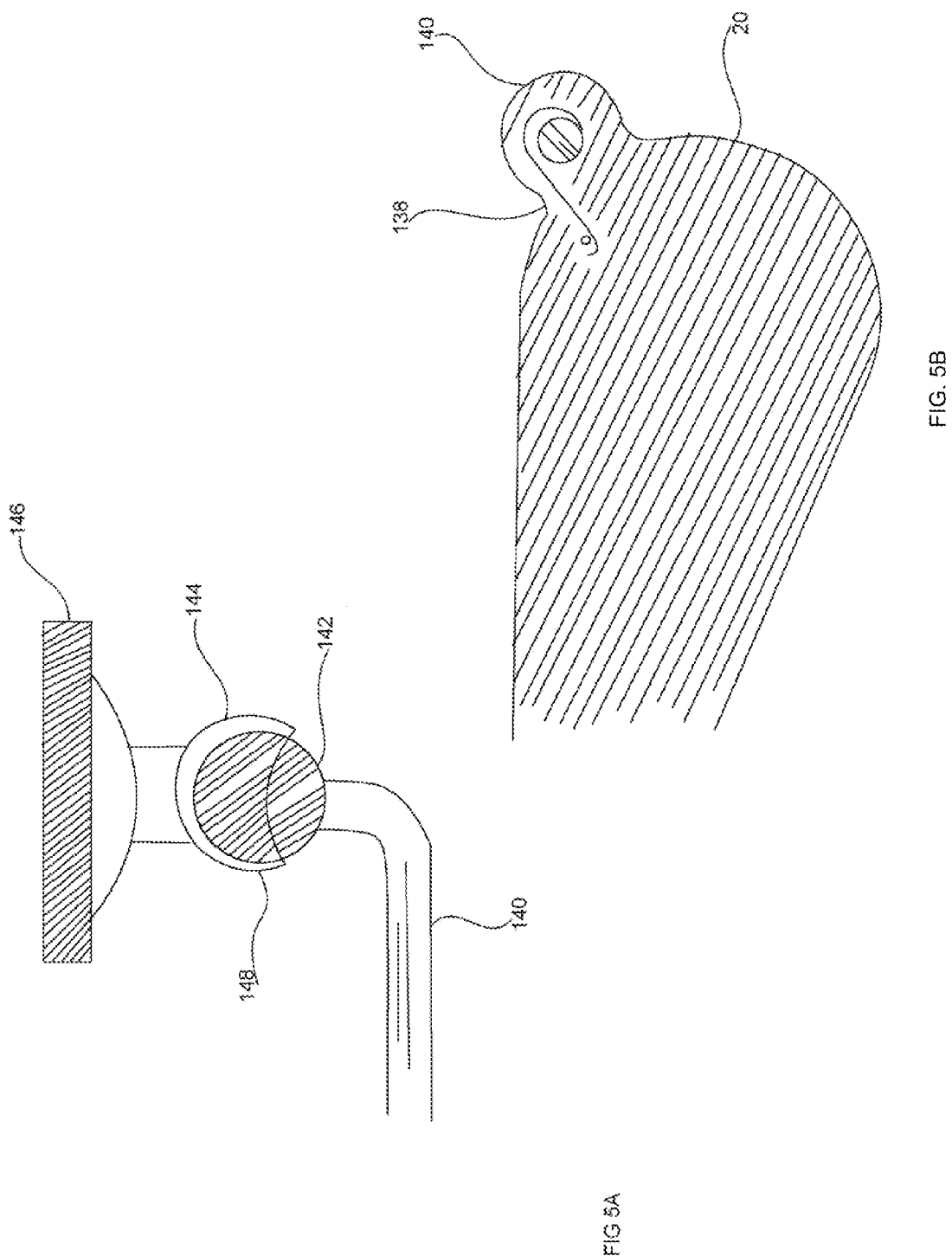

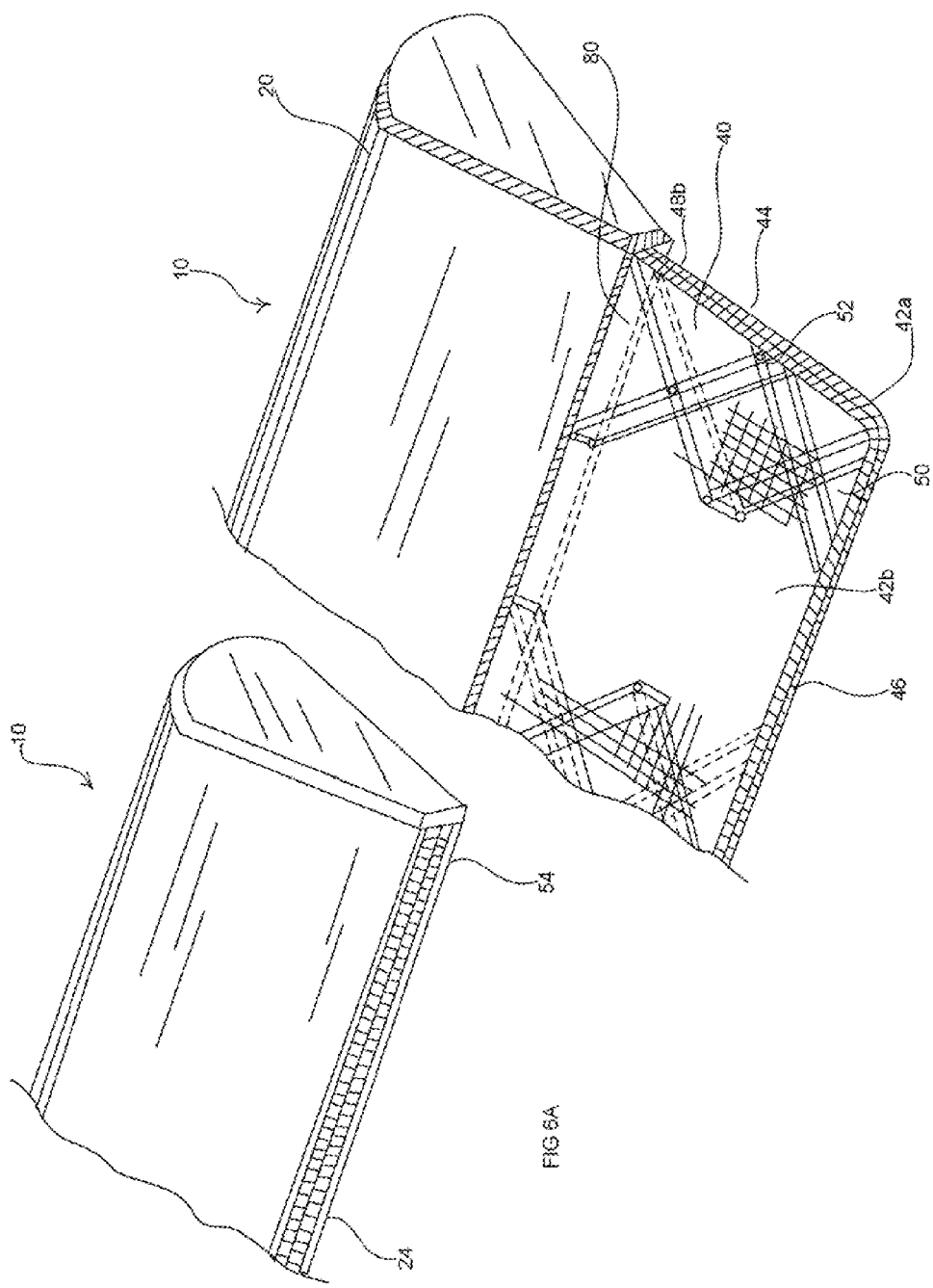

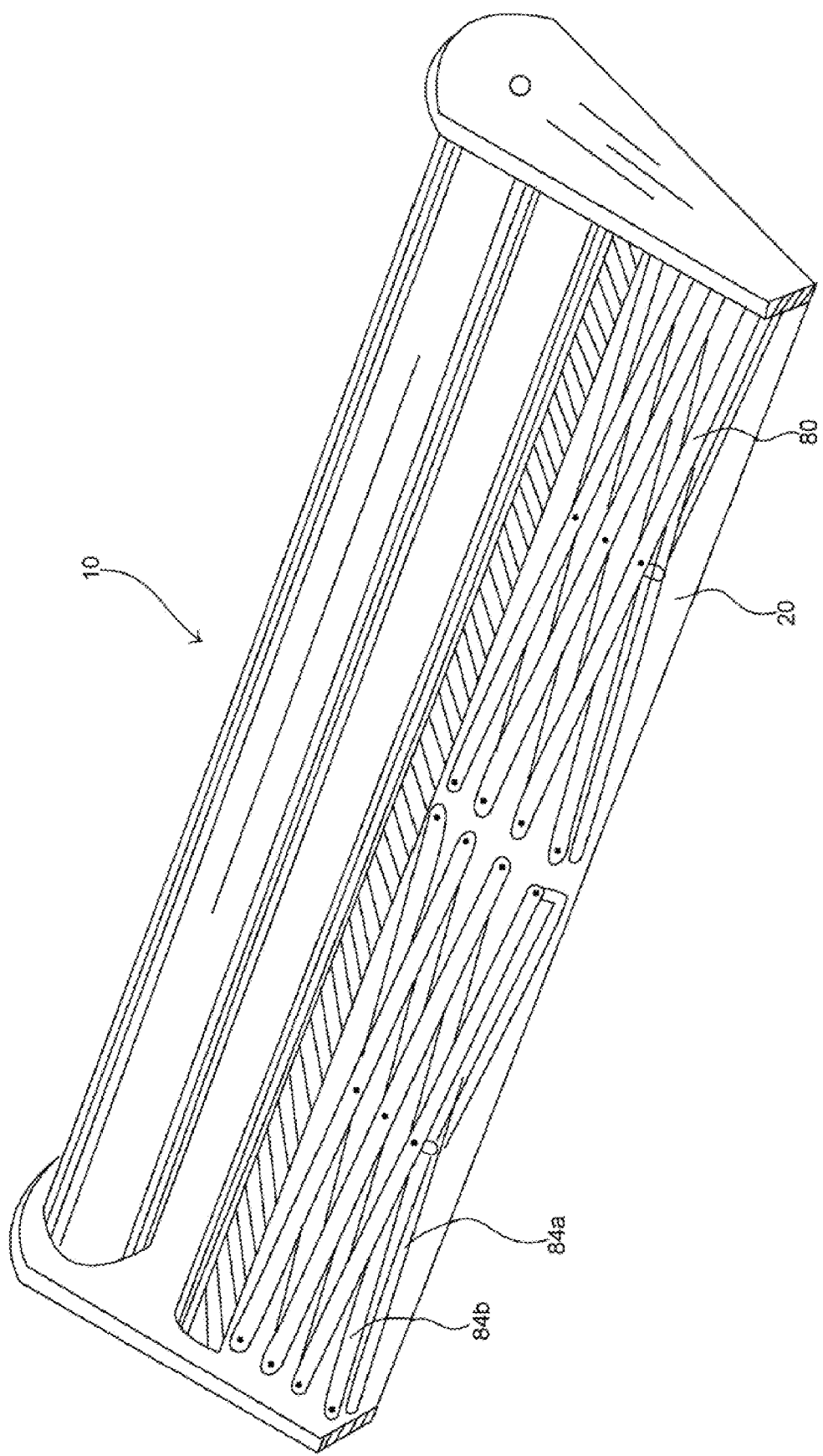

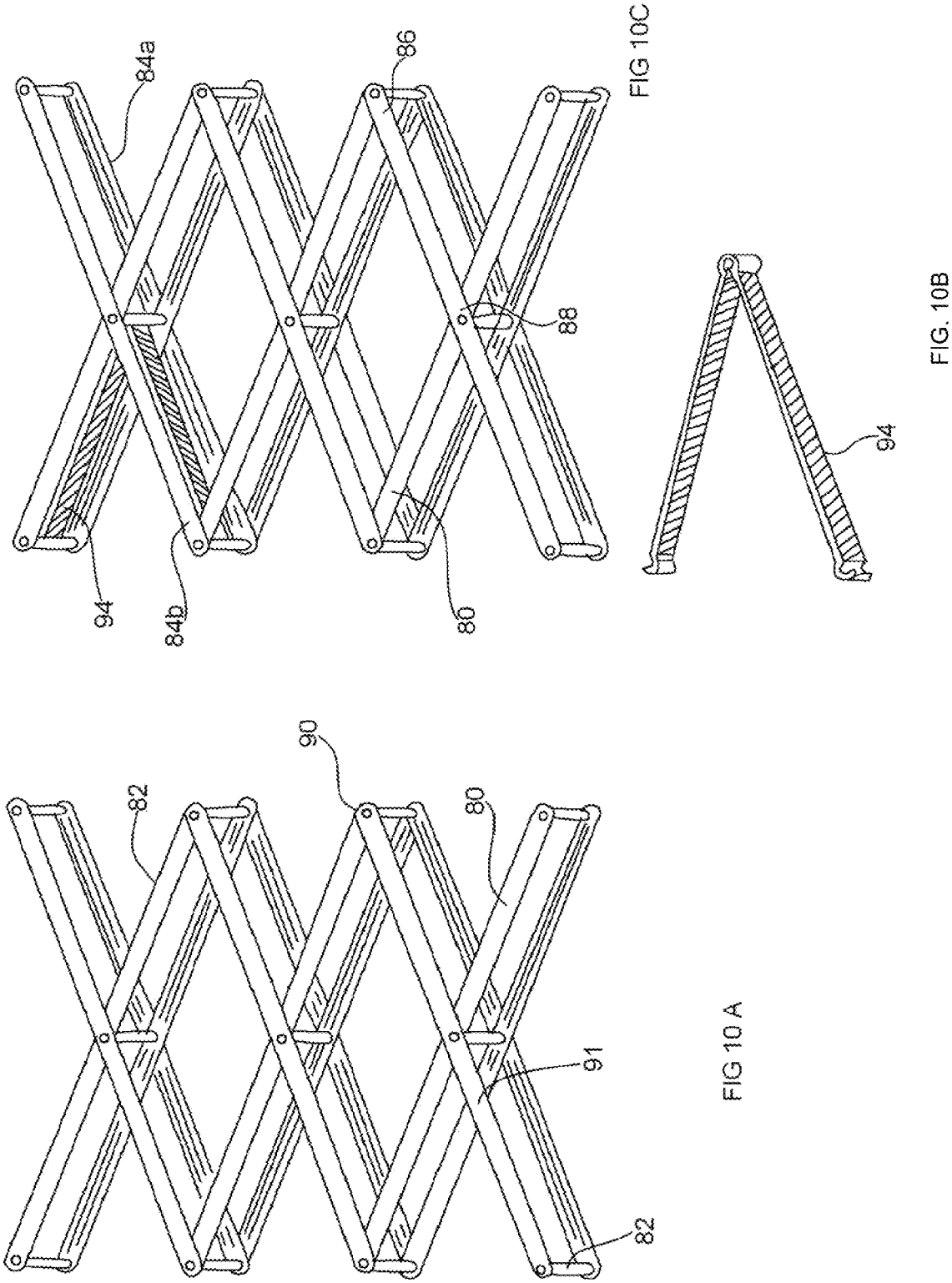

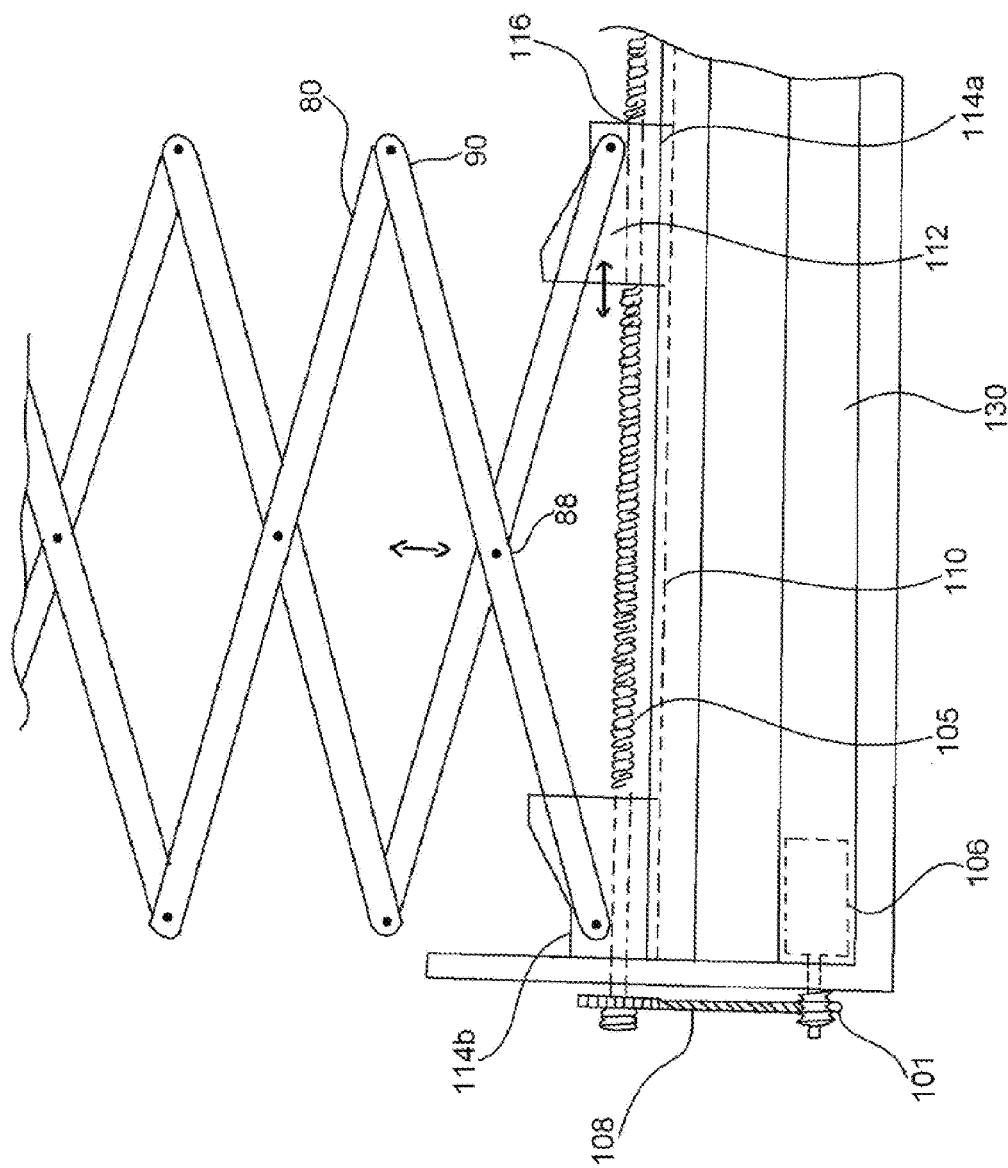

AUTOMOBILE SUN VISOR WITH ELECTROMECHANICAL SUN SHADE AND METHODS OF USE THEREOF

CROSS-REFERENCE TO RELATED APPLICATION

The present U.S. Non-Provisional patent application claims priority to and all benefit of United States Provisional patent application entitled "Electromechanical Automobile Sun Shade and Methods of Use Thereof," filed on Sep. 8, 2008, on behalf of inventors Rameshbhai Kalabhai Patel, Manishkumar Rameshbhai Patel, and Prashantkumar Rameshbhai Patel, and having assigned Ser. No. 61/191,495.

FIELD

The present disclosure relates generally to vehicle accessory devices, and more particularly, to an automobile sun visor with electromechanical sun shade and methods of use thereof.

BACKGROUND

Sunlight and glare can adversely affect driving safety, especially when sunlight is directly impacting within a driver's field a vision. Sun visors are in common use, however, very frequently are found to be inadequately limited in size and maneuverability to be effective shields. Furthermore, presently available sun visors are disadvantageously limited to the front seat of a vehicle, such that rear seat passengers are left with no option.

Sunlight also can have an adverse impact on a parked vehicle. For example, it is known that the interior temperature of a parked vehicle increases dramatically in a very short period of time. Not only does this render the interior very uncomfortable for reentry by the passenger(s), but, over time and upon repeated occurrence, damage to interior components may occur. For vehicles parked in direct sunlight, these issues are further magnified. As a result, many drivers seek to park in a garage or under a shade tree; however, many times, parking under some form of a sun barrier is impossible. Traditional vehicle visors are of essentially no effective use for such a situation. That is, front, back and side windows are not protected from incoming light by conventional sun visors. With particular reference to the front windshield, where traditional sun visors are installed, full protective coverage is nonetheless not provided thereby. Therefore, it is generally recognized that the deployment of a sun shade upon exiting the vehicle can serve to protect the exposed interior surfaces from potential UV damage, as well as to lessen and/or slow the heat build up inside the vehicle.

Many types of sun shades have been described. Common issues render many of these designs disadvantageous. For example, most shades require storage within the passenger compartment during periods of non-deployment, yet the size and shape prevent out-of-the-way placement. Another common disadvantage is the necessity for manual deployment by the vehicle operator. Many times such deployment is forgotten because the shade is out of reach and/or view, and other times the shade is simply ignored, either due to a hurried schedule or lack of desire to complete the task.

In order to overcome these disadvantages, sun shades have been developed with mechanical deployment. Each of these systems, however, is also disadvantageous in view of the present disclosure. For example, necessary support frames are primarily dimensionally limited, resulting in inadequate and/or unequal window coverage and preventing effective use in some windows entirely. Many are potentially subject to structural failure according to frame design. Additionally, known frames remain exposed when the shade is deployed, creating an unsightly display, and posing potential risk, especially to children, should they become curious with little fingers in and about such mechanisms during exit or re-entry to the vehicle.

Therefore, it is readily apparent that there is a need for an automobile sun shade that is easy to deploy and to store, that is strong, safe and effective for long-term use in essentially any vehicle on essentially any window, that can function as an adaptable and beneficially adjustable sun visor while a vehicle is in operation, and that is essentially adapted for use on any side of any window at any time and in any direction, thereby avoiding the above-discussed disadvantages.

BRIEF SUMMARY

Briefly described, in a preferred embodiment, the present electromechanical automobile sun shade, and methods of use thereof, overcomes the above-mentioned disadvantages and meets the recognized need for such a device by providing a vehicle sun shade adapted for automatic extension and/or retraction at the touch of a button, maximized for both aesthetic appearance and functionality, adapted as a coherent part of essentially any vehicle, and useful on essentially any window thereof.

According to its major aspects and broadly stated, in its preferred form, the present device is an electromechanical sun shade with a housing suitably shaped for installation and use as a traditional sun visor, wherein dual-layer screens surround a double arm, scissor-style support mechanism, securely and automatedly closing thereabout during deployment, wherein the deployed shade extends from the housing proximate a window edge, and wherein the retracted shade is enclosed within the housing during periods of non-use.

More specifically, the present electromechanical sun shade device, according to a preferred embodiment, preferably comprises an elongated housing with a generally tear-shaped profile that is adapted for spring-loaded, pivotally-adjustable installation at essentially any location proximate the interior roof of a vehicle and that attractively accommodates all necessary elements of the device therewithin, a scissor-type extension mechanism with interdependent, multi-stage frame support layers that evenly and supportively extend and adjust to a plurality of lengths, a two-layer screening system that surrounds the extension mechanism on all sides via a releasable connector, and that is adapted for preferential variation of interior versus exterior display during deployment, and a motorized control system with guide elements.

Preferably, the motorized control system and guide elements comprise a motor, drive train, cylinder chamber with slit and threaded shaft, and related piston with arm connection, all contained within the housing for directing the extension of the frame support and screen outwardly through the lip of the housing. The frame support preferably comprises a pair of multi-stage, double layer, scissor-type extension arms, wherein the arms are gently thrusted by push rollers as arm connections move along the threaded shaft to enable the expansion and retraction of the scissor-type mechanism in response to movement of the drive train.

The two-layer screening system preferably comprises a spring-loaded roller, with two separate screens opposingly positioned relative to the frame support, wherein the distal end of each screen is secured to plurality of push rollers. Preferably, each screen has engageable peripheral side edges, such as a zipper. In such arrangement, as the extension arms extend, both screens are unwound accordingly, and coincidentally therewith, the peripheral side edges of the screens are engaged, or zipped, together in order to essentially surround the frame.

According to another embodiment, the motorized control system and guide elements may comprise a motor, drive train, threaded shaft and related guide rail and sliders, all contained within the housing for directing the extension of the frame support and screen outwardly through the lip of the housing. The frame support comprises a pair of multi-stage, double layer, scissor-type extension arms, wherein the arms are supported by a guide rail and via sliders that move along the threaded shaft to enable the expansion and retraction of the scissor-type mechanism in response to movement of the drive train.

Thus, a feature and advantage of the present device is its ability to perform as an effective sun visor and sun shield for essentially any vehicle window.

Another feature and advantage of the present device is its ability to be installed for vertically downward deployment relative to the orientation of a vehicle, in lieu of and/or in addition to a traditional horizontal deployment.

Another feature and advantage of the present device is the ability of its vertical deployment to allow for adjustable length expansion according to window height variation.

Yet another feature and advantage of the present device is the ability of its vertical deployment to allow for side-by-side deployment of a plurality of devices on expansive windows, such as a windshield, without substantial gap therebetween.

Still another feature and advantage of the present device is its ability to be automatically extended and/or retracted by an activation switch and/or signal transmission.

Yet another feature and advantage of the present device is its ability to perform as a visor, preventing excessive light and heat from entering a vehicle while driving, and to perform as a barrier, protecting a vehicle dash and interior from excessive light and heat while parked.

Yet still another feature and advantage of the present device is its ability to provide a double layer of shielding protection against both light and heat, thereby enhancing aesthetics and performance.

Still another feature and advantage of the present device is its ability to enable selective variation of color and design on opposingly exposed shade faces, thereby facilitating display of an artistic look and/or becoming a coherent part of essentially any vehicle.

Still yet another feature and advantage of the present device is its ability to springedly and adaptively position in close proximity to a window glass surface, irrespective of extension length.

Another further feature and advantage of the present device is its ability to be mounted and/or installed in a plurality of vehicle interior positions, such as, for example, proximate the top of the windshield, the top or bottom of the rear window, and/or proximate the top, bottom, or side of a side window.

Another feature and advantage of the present device is its ability to be mounted between a vehicle headliner and vehicle roof.

Still another feature and advantage of the present device is its ability to provide great comfort and luxury by smooth and accurate operation.

Still a further feature and advantage of the present device is its ability to house mechanical parts hidden within a pleasant unit during periods of non-use.

Yet still a further feature and advantage of the present device is its ability to cover frame parts hidden within an appealing dual-screen during periods of extended use.

Still a further feature and advantage of the present device is that its durability, accurate performance, and ease of switch and/or remote control operation enable cost effective vehicle adaptation.

Yet still another feature and advantage of the present device is its ability to protectively cover the operational components to prevent inadvertent contact during vehicle entry and/or exit.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 5A is an enlarged, perspective view of the ball-and-socket joint of FIG. 4;

FIG. 5B is a side view of the sun visor of FIG. 4, showing installed placement of the spring and the attachment bar of the ball-and-socket joint;

FIG. 6A is a cutaway, perspective view of a sun visor with an electromechanical sun shade, showing the shade in a fully retracted position;

FIG. 6B is a cutaway, perspective view of the sun visor of FIG. 6A, showing the shade in a partially extended position, and allowing visualization of the support frame through the shade;

FIG. 9 is a perspective view of an automobile sun visor with electromechanical sun shade, showing a partial housing and a retracted support frame without a shade;

FIG. 10A is a perspective view of a double-layer, multi-stage scissor-type support frame of the present device;

FIG. 10B is a perspective view of a spring for incorporating into the support frame of the present device;

FIG. 10C is a perspective of the support frame of FIG. 10A, showing the spring installed thereon;

FIG. 11A is a cutaway, sectional plan view of an automobile sun visor with electromechanical sun shade device, showing placement of a motor in a roller, a drive train, a threaded shaft, a guide rail, a moveable slider, a fixed slider, and a partially extended frame, according to an alternate embodiment of the present device;

DETAILED DESCRIPTION OF THE PREFERRED AND ALTERNATE EMBODIMENTS

Figure 1A:
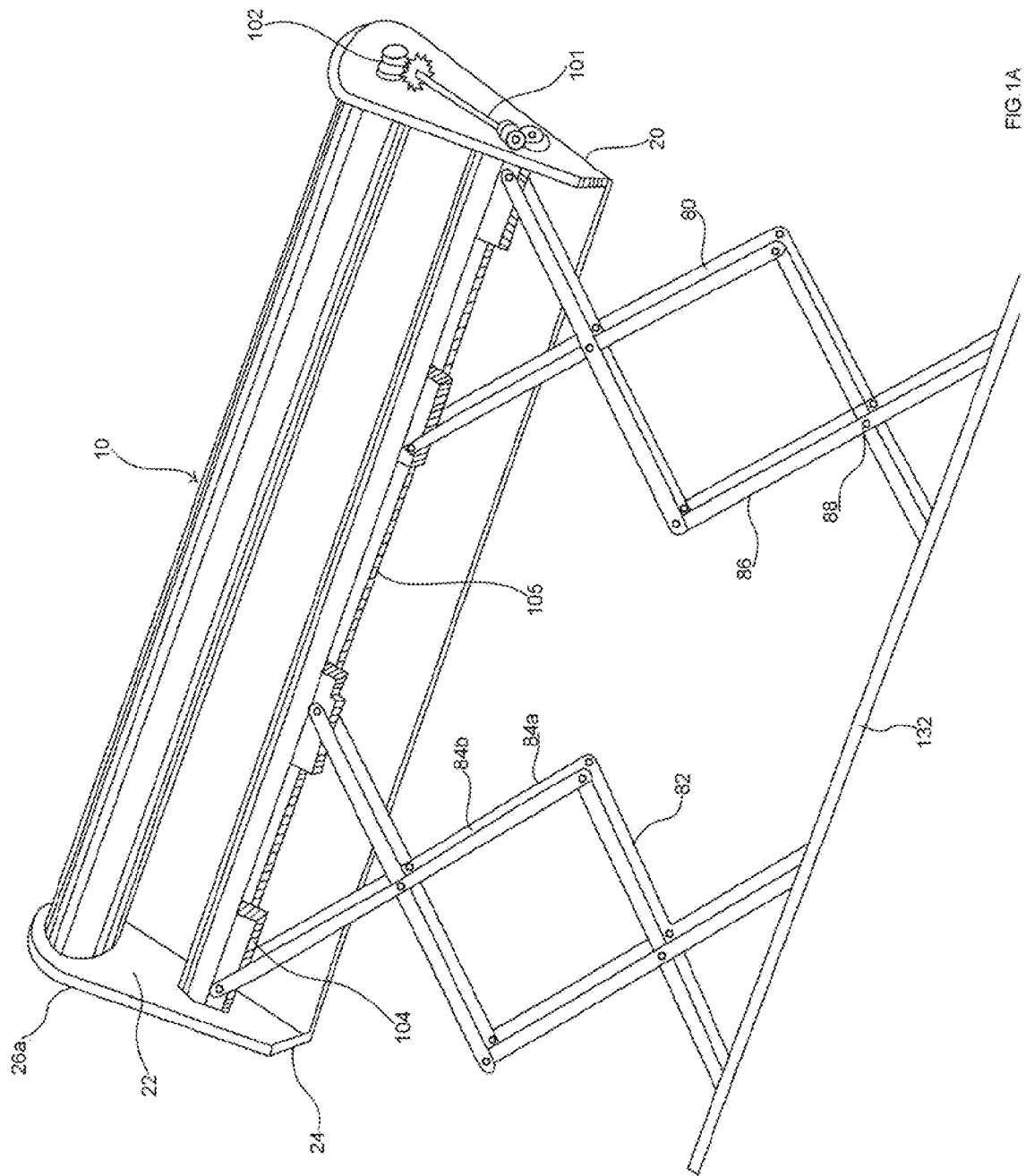
FIG. 1A is a perspective view of an automobile sun visor with electromechanical sun shade, according to an alternate embodiment of the present device, showing a partial housing and a partially extended support frame without a shade.
Figure 1B:
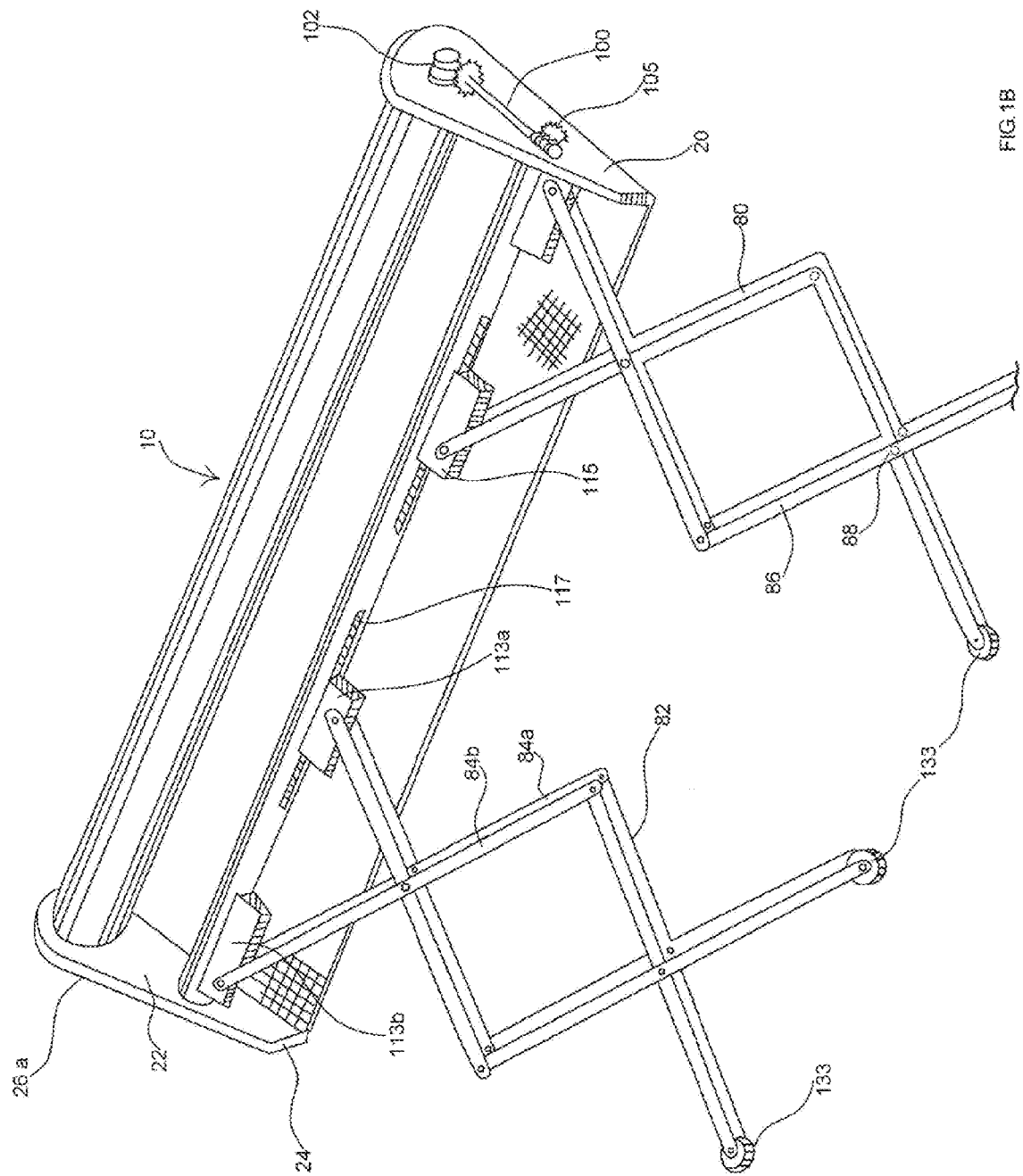
FIG. 1B is a perspective view of an automobile sun visor with electromechanical sun shade, according to a preferred embodiment of the present device, showing a partial housing and a partially extended support frame without a shade.
Figure 2:
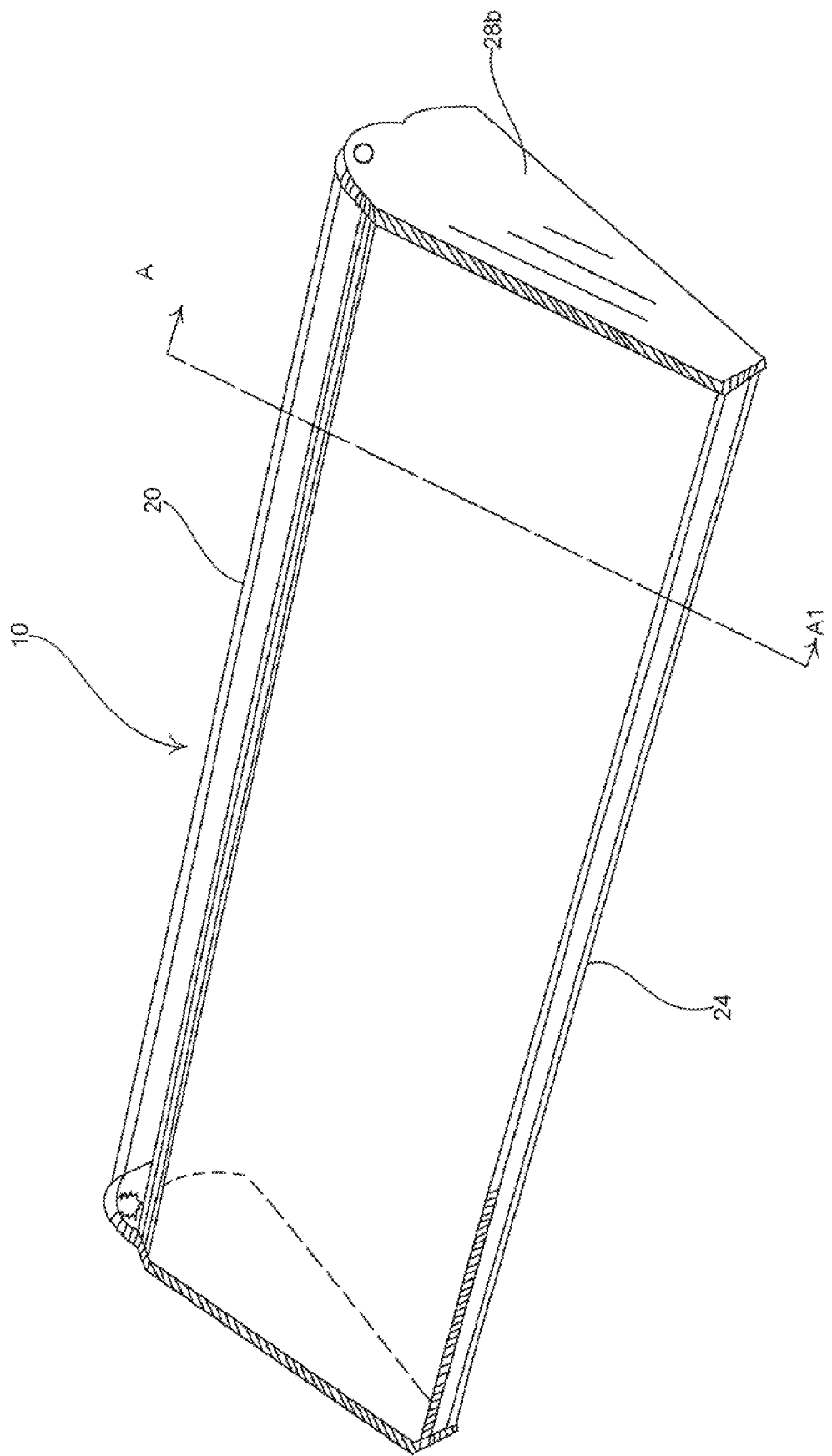
FIG. 2 is a perspective view of a housing for the device of FIGS. 1A and 1B.

In describing the preferred and alternate embodiments of the present device, as illustrated in the figures and/or described herein, specific terminology is employed for the sake of clarity. The device, however, is not intended to be limited to the specific terminology so selected, and it is to be understood that each specific element includes all technical equivalents that operate in a similar manner to accomplish similar functions.

Referring now to FIGS. 1-16, vehicle sun visor with electromechanical sun shade device 10, and methods of use thereof, preferably comprises housing 20, screening 40, support frame 80, and operational mechanism 100. Housing 20 is preferably elongated, with a generally tear-shaped, or pie-shaped profile and shade port 24, wherein it is preferred that the dimensions of interior compartment 22 of housing 20 are adapted to contain all functional components of sun visor device 10. It should be recognized, however, that although such aesthetically and functionally pleasing containment of functional components is preferred, an alternate embodiment could allow for exposure of at least some of the functional components of sun visor device 10. It should specifically be recognized that use of the word shade is not intended to introduce any limitation, wherein other applicable terms could be utilized, such as, for exemplary purposes, screen. Additionally, other shapes could be utilized, in addition to tear or pie-shaped, such as, for exemplary purposes only, prismatic.

Support frame 80 is preferably defined by scissor-type extension mechanism 82 with interdependent, multi-stage frame support layers 84a, 84b that evenly and supportively extend and adjust to a plurality of lengths. Each stage 86 is preferably X-shaped, with crossing arms 91 and central pivot point 88. As seen in FIGS. 10A, 10B, and 10C, in the preferred embodiment, a plurality of stages 86 are pivotally linked at plurality of distal ends 90, resulting in definition of scissor-type mechanism 82. It should be noted, however, that device 10 could be constructed with only a single stage 86 for utilization in applications necessitating shorter length, or could be constructed with two, three, or more stages 86, as desired for more extended length applications.

In order to maximize strength of support frame 80, two layers 84a, 84b are preferably related together at plurality of central pivot points 88 and at plurality of pivotally linked distal ends 90 via plurality of extension links 92. Such a structure serves to strengthen support frame 80, whether only partially extended or during full extension thereof. Additionally, leaf spring 94 is preferably engaged between layers 84a, 84b. In such manner, initial extension motion is springedly assisted, wherein motor strain is thereby minimized. That is, as may be apparent in viewing FIG. 9, when support frame 80 is in a fully retracted position, leaf spring 94 (seen in FIGS. 10B-10C) is essentially compressed. According to the preferred embodiment, as arm connectors 113 begin movement in response to rotation of threaded shaft 105, leaf spring 94 undergoes decompression, assisting in the expansion of support frame 80 such that initial resistive forces to the movement of arm connectors 113 are lessened and the necessary initial work by motor 106 is effectively reduced. According to an alternate embodiment, as described further herein, similar assistance by leaf spring 94 is directed to sliders 112. It should be noted that the number and type of springs 94 may be varied, and alternate springs 94 may be utilized as well, in lieu of, or in addition to leaf springs.

Figure 16:
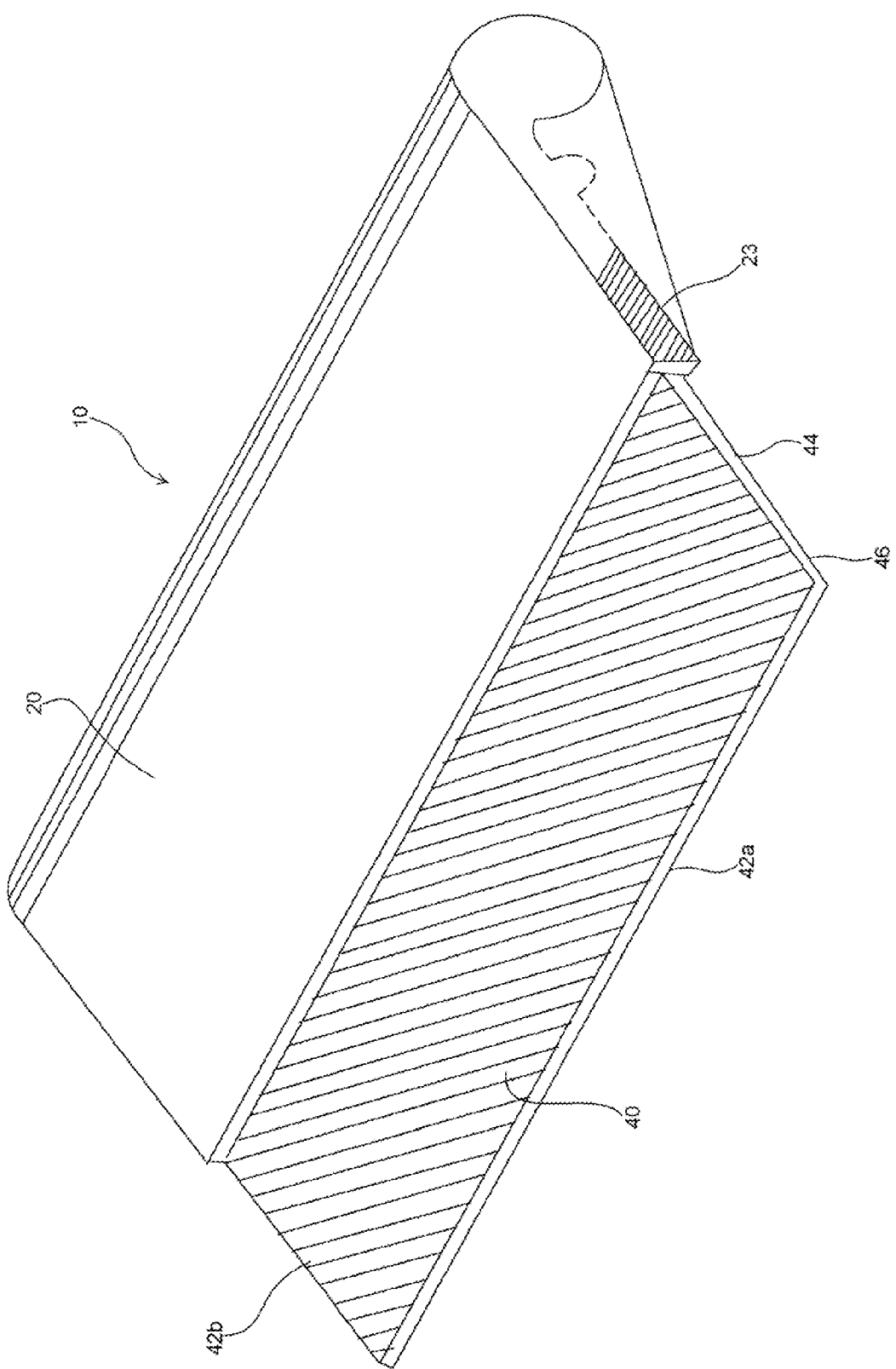
FIG. 16 is a perspective view of an automobile sun visor with electromechanical sun shade device, showing the housing with the sun shade partially extended therefrom and showing the lip supporting the sun shade.

In the preferred embodiment, as seen in FIGS. 6B and 16, screening 40 preferably comprises two layers 42a, 42b that surround extension mechanism 82, wherein layers 42a, 42b are secured to plurality of push rollers 133, and wherein releasable connector 44 secures layers 42a, 42b together to define deployed shade edge 46. The preferred independence of layers 42a, 42b of screening 40 beneficially enables selective variation of color and/or decorative display therebetween, such that, for example, interior-facing shade panel 48a could decoratively correspond to the interior features of the vehicle and exterior-facing shade panel 48b could display a sports or collegiate mascot. One skilled in the art should readily recognize that layers 42a, 42b may be of the same color, or may differ, and essentially any desirable pattern, image, trademark, or the like may be displayed thereon. Additionally, it should be noted that screening 40 could be made from any suitable material, such as, for exemplary purposes only, cloth, synthetic fiber, polyester fiber, plastic, or any suitably light and heat-resistant material.

Motorized control system 102 and plurality of guide elements 104 preferably define operational mechanism 100, preferably comprising motor 106, drive train 108, rubber pulley support 109, threaded shaft 105, cylinder chamber 111 and plurality of arm connections 113, represented in FIGS. 1B, 7B, 11B, and 13B; however, it should be noted that motorized control system 102 could be installed on either end of housing 20. Additionally, drive train 108 could be any suitable structure, such as worm to worm gear, or helical to helical, without limitation. Arms 91 of support frame 80 are preferably supported by cylinder chamber 111 through engagement with plurality of arm connections 113, wherein preferably each crossing arm 91 of X-shaped stage 82 is secured to one ear 115 of one arm connection 113, and wherein preferably, fixed arm connections 113b is secured proximate threaded shaft 105 and cylinder chamber 111 and movable arm connections 113a is adapted for movement along threaded shaft 105 and cylinder chamber 111, wherein cylinder chamber 111 preferably has slit 117 defined therewithin to allow for movement of plurality of arm connections 113. The preferred shape of each arm connection 113, with ear 115 to facilitate attachment of arms 91 thereto, also facilitates movement of arm connections 113 within slit 117, as ear 115 has shorter length than that of slit 117. As will be further discussed herein below, it is the movement of threaded channel 121 of arm connections 113a along threaded shaft 105, and in cylinder chamber 111, relative to the fixed position of arm connections 113b, that enables the expansion and retraction of scissor-type mechanism 82 in response to movement of drive train 108, wherein extension may be exemplarily seen in FIG. 1B and retraction in FIG. 9.

Figure 14B:
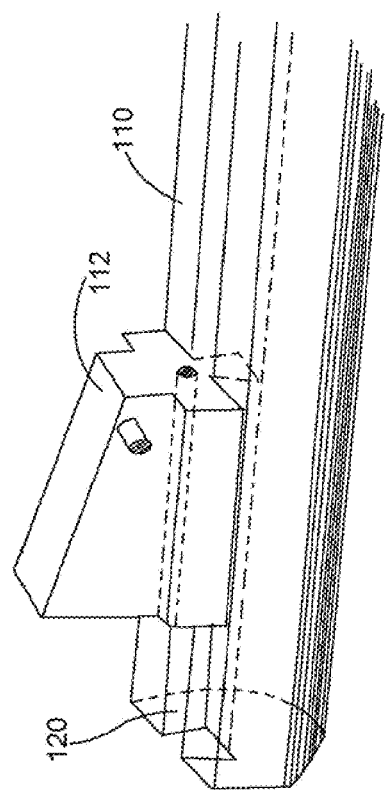
FIG. 14B is a perspective view of the slider and guide rail of FIG. 14A, showing slidable interconnection thereof.
Figure 14A:
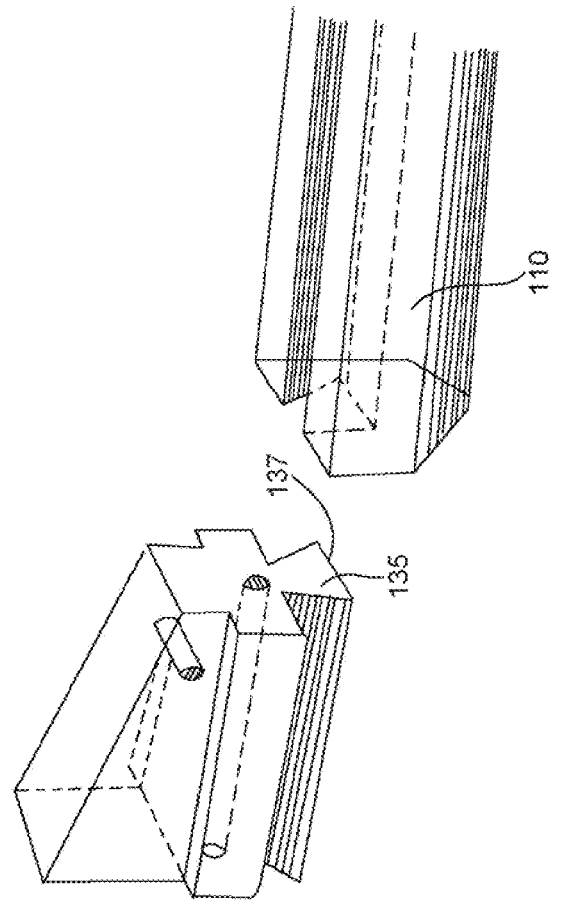
FIG. 14A is a perspective view of a slider and a guide rail, showing disassembly, according to an alternate embodiment of the present device.
Figure 14C:
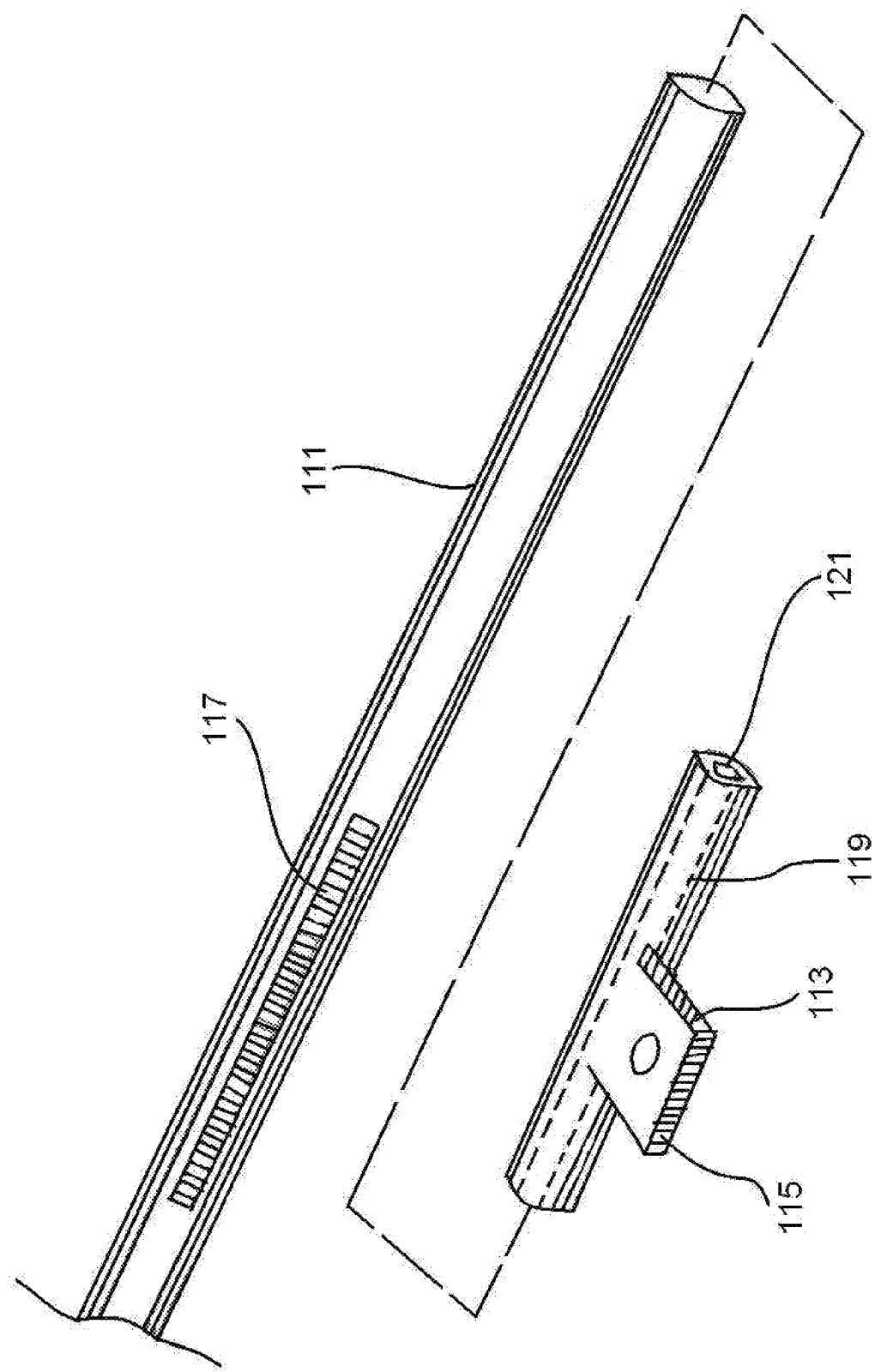
FIG. 14C is a perspective view of a cylinder chamber with slit and piston with arm connection, showing disassembly, according to a preferred embodiment of the present device.
Figure 15:
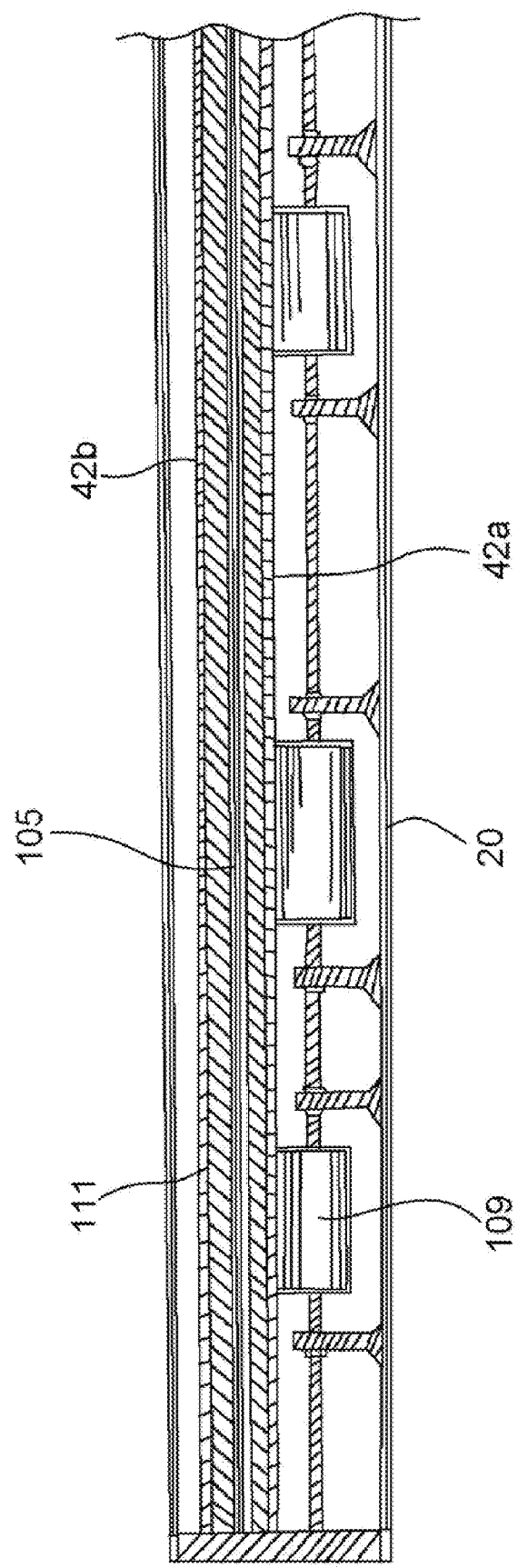
FIG. 15 is a sectional front view of an automobile sun visor with electromechanical sun shade device, showing roller pulley support of the screen, cylinder chamber, threaded shaft, and other elements.

Further, as exemplarily represented in FIG. 14C, and as noted above, slit 117 is preferably defined in cylinder chamber 111, wherein ear 115 of each arm connection 113 is seated within slit 117 to allow movement along threaded shaft 105, and such that movement is restricted only to axial movement relative to the length of cylinder chamber 111, and wherein the preferred structural configuration of arm connection 113, with a generally enlarged base segment 119, prevents disengagement of arm connections 113 from slit 117 of cylinder chamber 111. Moreover, threaded channel 121 of arm connection 113 serves to firmly engage with threaded shaft 105. Further representation of this preferred arrangement is depicted in the cross-sectional view of FIG. 13B.

In addition to the motorized control system 102 and guide elements 104 that are contained within housing 20, spring-loaded roller 130 extends, rotationally mounted, between endwalls 26a, 26b of housing 20, wherein layers 42a, 42b of screening 40 are supported thereabout. That is, proximal end (not shown) of each screen layer 42a, 42b is secured to roller 130, with screen layer 42a passing between rubber pulley support 109 and cylinder chamber 111, screen layer 42b passing over cylinder chamber 111, and distal end 50 of each screen layer 42a, 42b secured to plurality of push rollers 133, wherein rubber pulley support 109 may have any desirable number of support members. In such manner, exterior-facing shade panel 48b is deployed proximate layer 84b of support frame 80 and interior-facing shade panel 48a is deployed proximate layer 84a of support frame 80, in opposing positions relative to scissor-type mechanism 82.

Additionally, each screen layer 42a, 42b is adapted with engageable peripheral edging 52, preferably zipper 54, wherein during deployment, as will be discussed further herein, deployed shade edge 46 results from engagement of edging 52. It should be understood that engageable peripheral edging 52 could alternately comprise hook-and-loop fastener, snap lock, or any other suitable, releasable-fit engagement mechanism. Nonetheless, according to the preferred configuration with engageable peripheral edging 52, when shade 10 is in deployed state, screen layers 42a, 42b are secured together, resulting in a general encasing of support frame 80 by screening 40, as is depicted in FIG. 16, wherein the leading edge is defined by push roller. Lip 23, also seen in FIG. 16, may preferably be defined by housing 20 for further strength enhancement of extended support frame 80 proximate shade port 24 of housing 20, allowing for steady and straight extension of support frame 80 in essentially any direction relative to the ground.

Figure 7A:
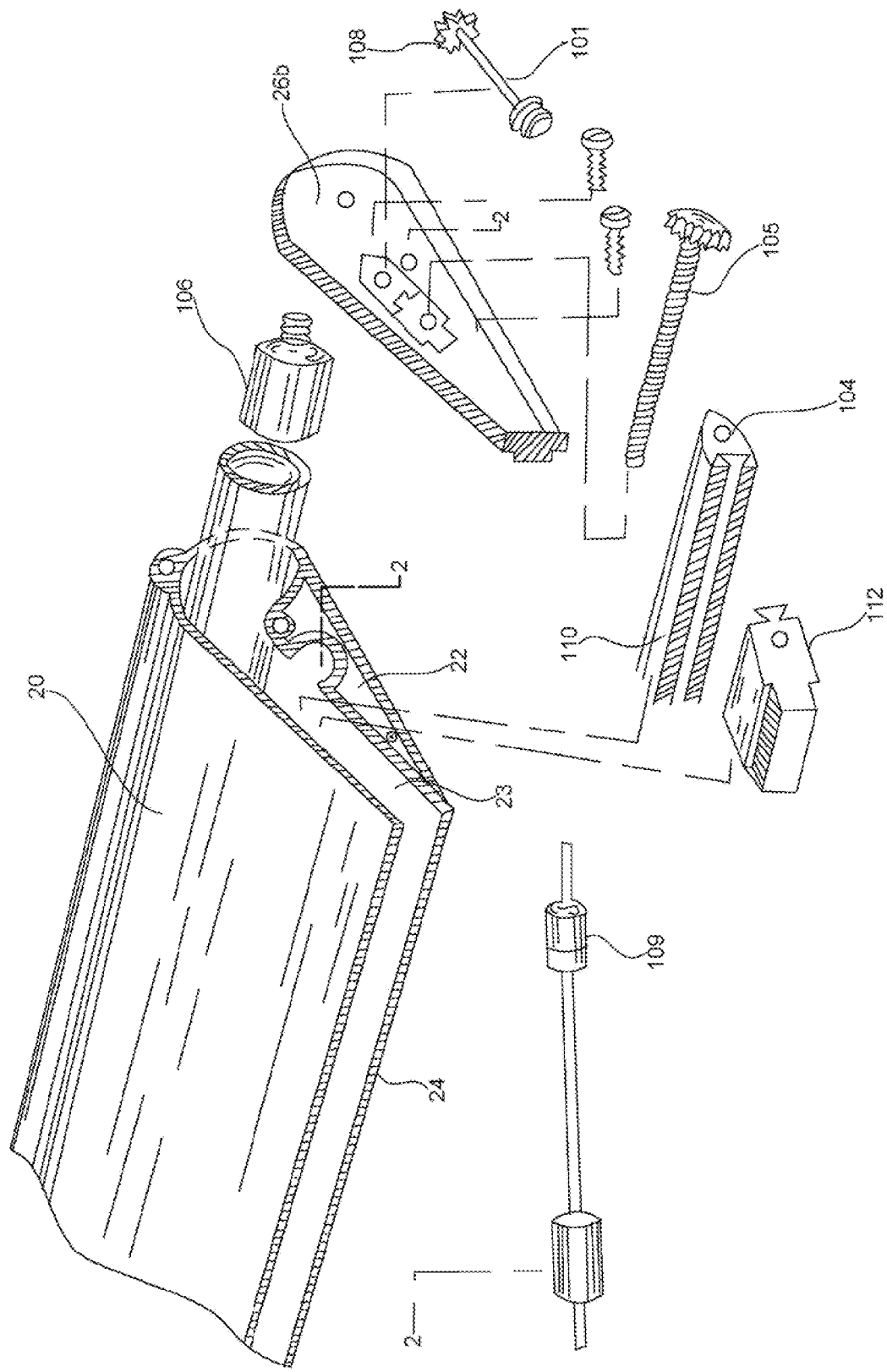
FIG. 7A is an exploded, cutaway perspective view of an automobile sun visor with an electromechanical sun shade, showing operating mechanism components and the housing, according to an alternate embodiment of the present device.
Figure 7B:
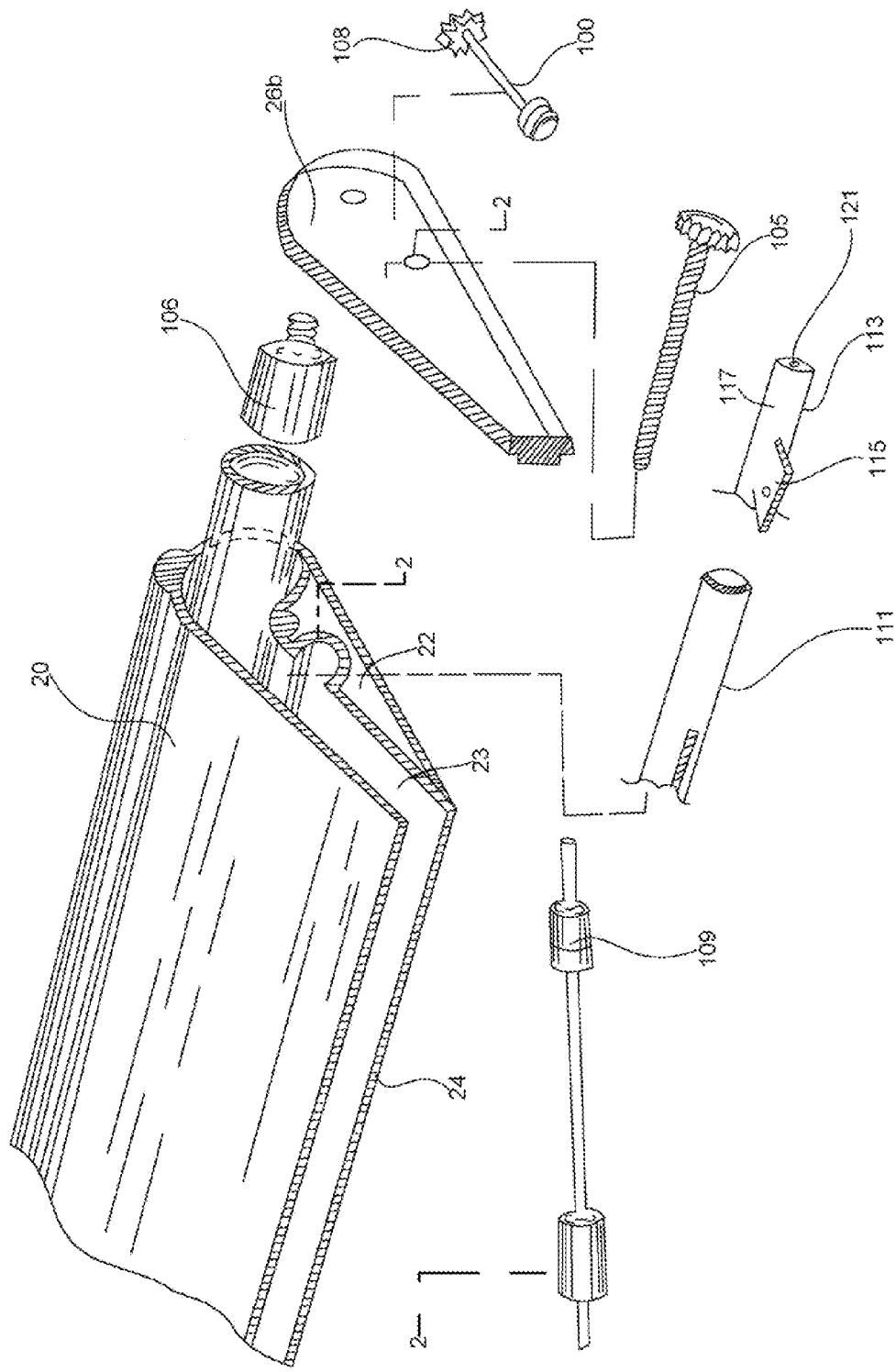
FIG. 7B is an exploded, cutaway perspective view of an automobile sun visor with an electromechanical sun shade, showing operating mechanism components and the housing, according to a preferred embodiment of the present device.

Motor 106 is preferably a stepper motor adapted for user-activation, such as via an on-board switch (not shown) and/or remote signal activator and receiver. As shown in FIG. 7B, motor 106 is preferably housed within roller 130, in functional communication with drive train 108, wherein engagement of motor 106 in a first mode directs rotational movement of threaded shaft 105, such that the preferred threaded nature of threaded shaft 105 engages internally threaded channel 121 of arm connection 113a, resulting in movement of arm connection 114a along cylinder chamber 111 and from a generally central location within housing 20 toward an endwall 26a, 26b. In such manner, crossed arms 91 of X-shaped stage 82 are brought closer together by pivot action at central pivot point 88, and support 80 is extended. It should be noted that threaded shaft 105 is preferably directionally subdivided, wherein a first half length is threaded left and a second half length is threaded right. In such manner, threaded shaft 105 is able to functionally accommodate movement of a dual, scissor-type extension mechanism 82, with a first arm connection 113a may move along threaded shaft 105 in a first direction and a second arm connection 114a may move along threaded shaft 105 in a second direction, essentially moving apart from a generally central position along threaded shaft 105.

Because the preferred construction of device 10 facilitates extension and support of screening 40 in either vertical or horizontal orientation relative to a vehicle window, and because the length of extension of shade 10 is not limited by the length of housing 20, essentially any vehicle window may be effectively and adaptively covered thereby, by selective manipulation of extension and/or orientation of device 10. As easily seen in FIG. 3, a plurality of devices 10 may be coincidentally installed and utilized on a plurality of windows.

Moreover, the preferred dual-scissor configuration results in strength enhancement, wherein the necessary movement of arm connection 113a is minimized such that the entire unit is consistently stable, with even pressure distribution and prevention and/or elimination of slack in screening 40. Of course, one skilled in the art should readily recognize that device 10 could alternately be configured with only one scissor configuration and/or could be configured wherein both arm connections 113a and 113b were moveable, with resulting influence on performance. Additionally, especially for uses requiring minimal extension, device 10 could be constructed with frame 80 comprising a single layer, essentially without compromise to the strength thereof since extension is not telescopic. Further, the number of stages 86 may be varied, wherein three is shown exemplarily herein, according to the intended length of extension, or as desired; for example, a single stage 86 could be employed for shorter length applications.

Engagement of motor 106 in a second mode preferably directs movement of threaded shaft 105 in a rotationally opposite direction to that of the first mode, wherein movement of arm connection 113a along cylinder chamber 111 is encouraged away from endwalls 26a, 26b, and wherein crossed arms 91 of X-shaped stage 82 are again distanced from one another by pivot action at central pivot point 88, and support 80 is retracted. It should be noted that while stepper motor is preferred, any suitable motor 106 could alternately be utilized. The preferred spring-loaded nature of roller 130 facilitates the winded retraction of shading 40 coincident with retraction of support frame 80, wherein shading 40 is rolled up and around roller 130.

Figure 8B:
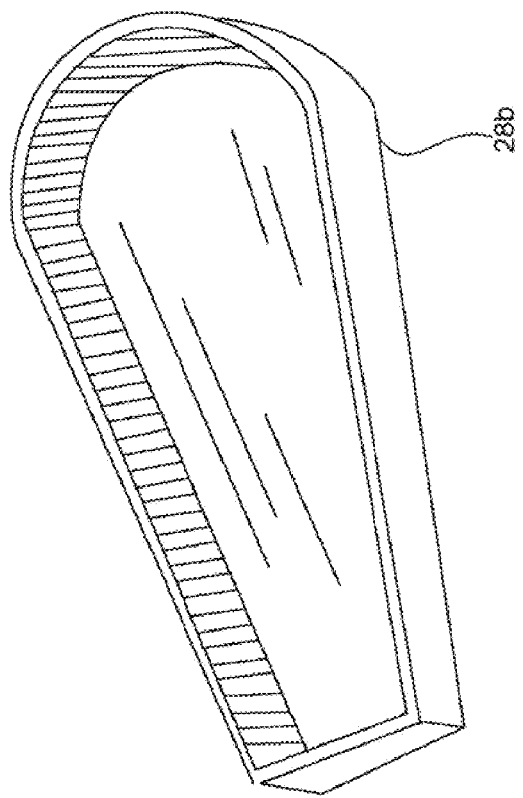
FIG. 8B is a perspective view of a side cover plate for the housing.
Figure 8A:
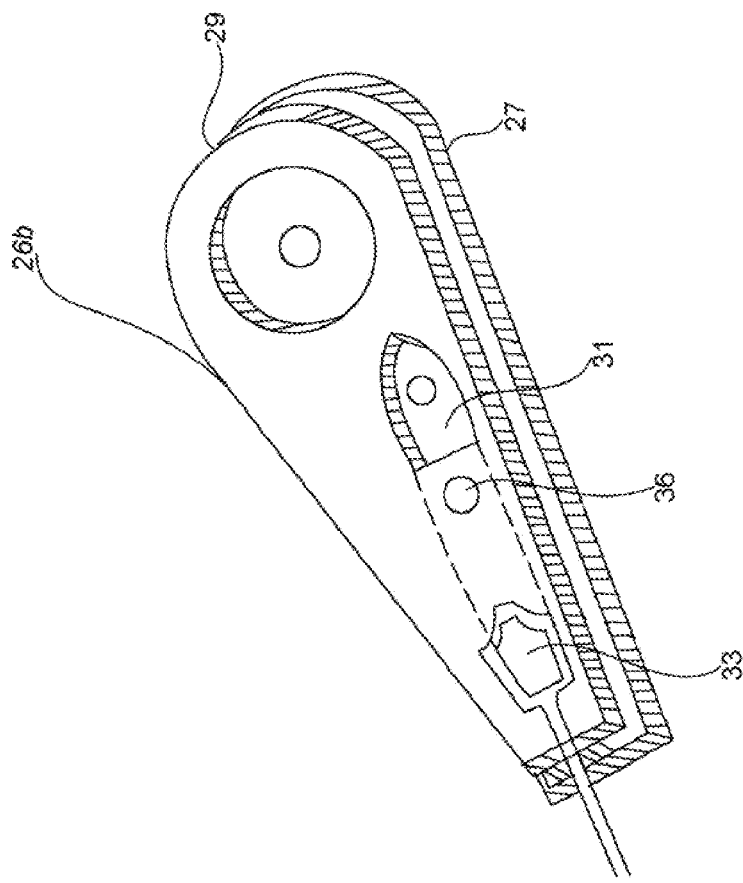
FIG. 8A is a perspective view of an inner side plate of the housing, showing a motor cavity, threaded shaft mount, guide rail support recess, and zip locker.
Figure 11B:
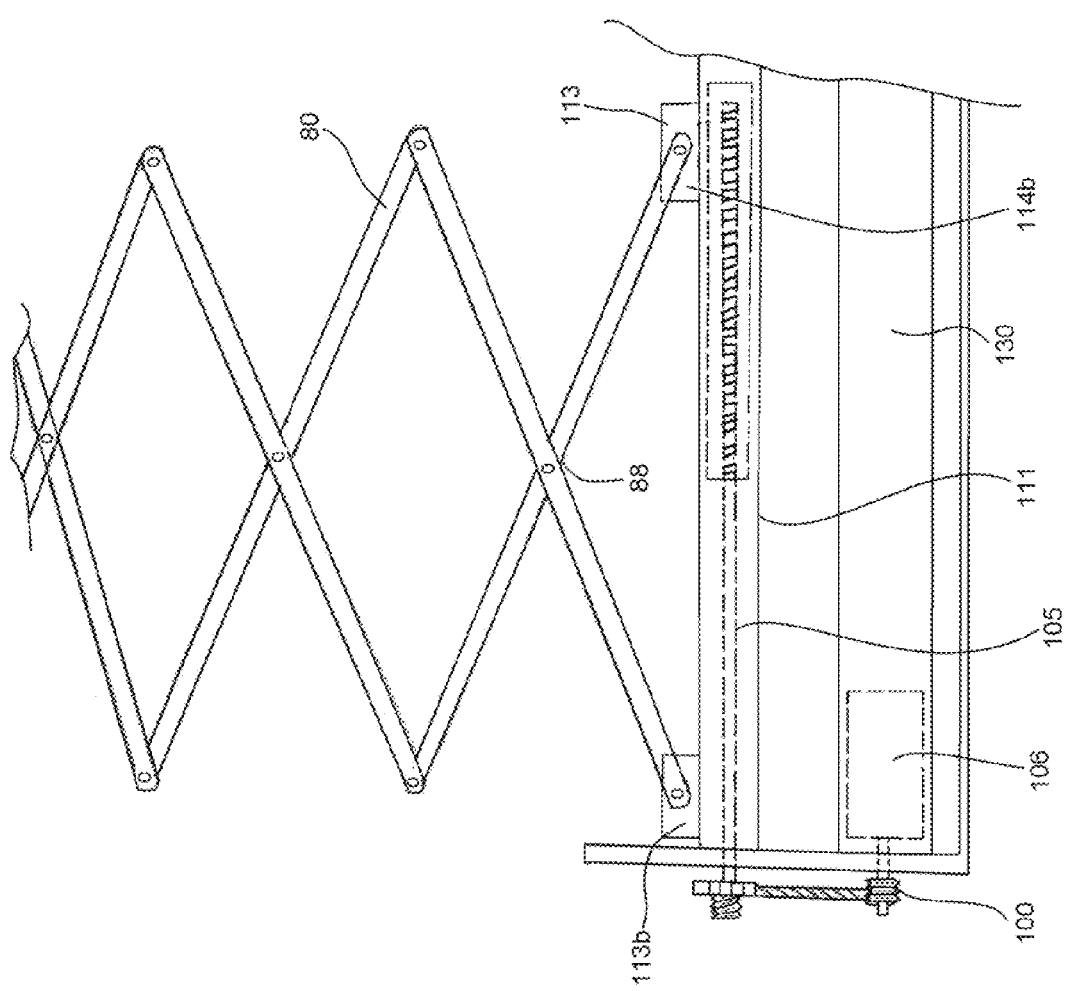
FIG. 11B is a cutaway, sectional plan view of an automobile sun visor with electromechanical sun shade device, showing placement of a motor in a roller, a drive train, a threaded shaft, a cylinder chamber with slit, a piston with ear shape for arm connection, and a partially extended frame, according to a preferred embodiment of the present device.
Figure 12:
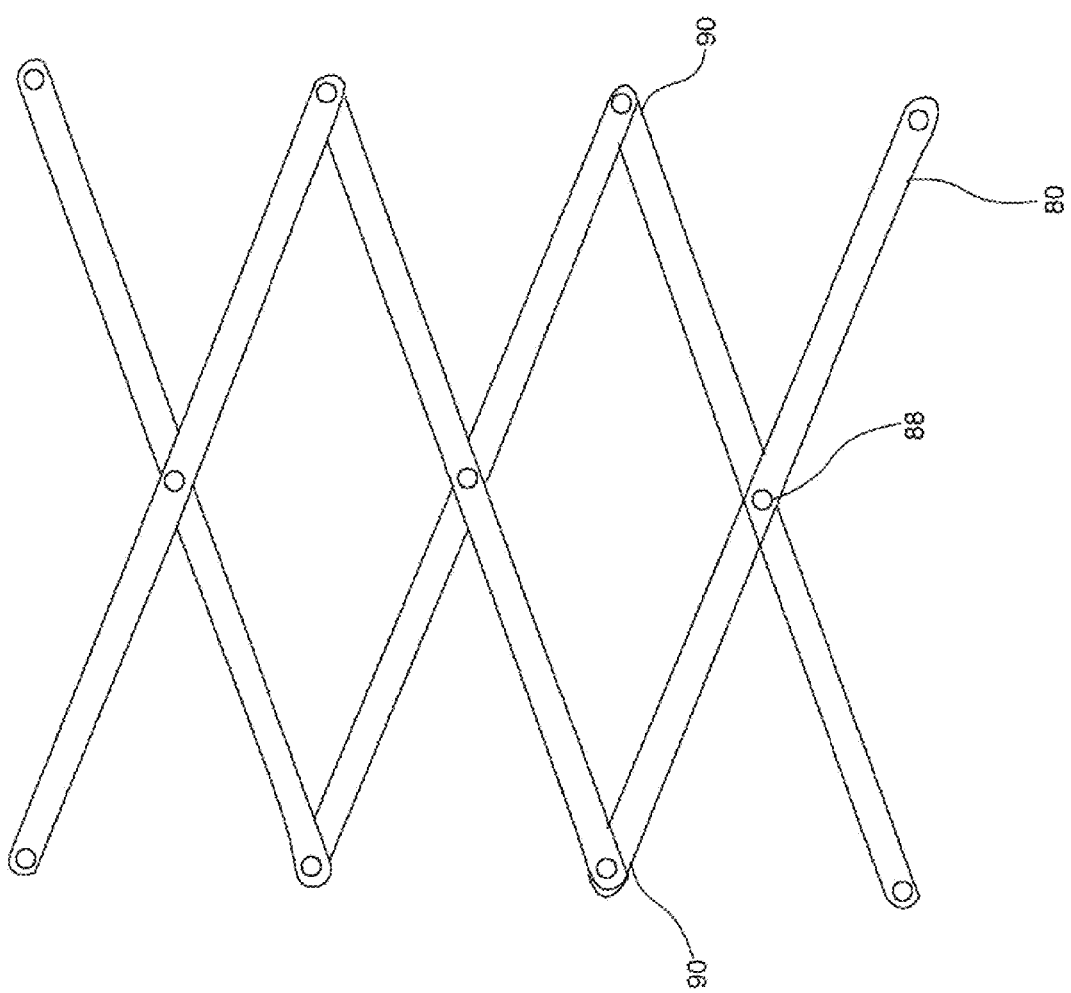
FIG. 12 is a plan view of a single layer support frame, according to an alternate embodiment of the present device.
Figure 13A:
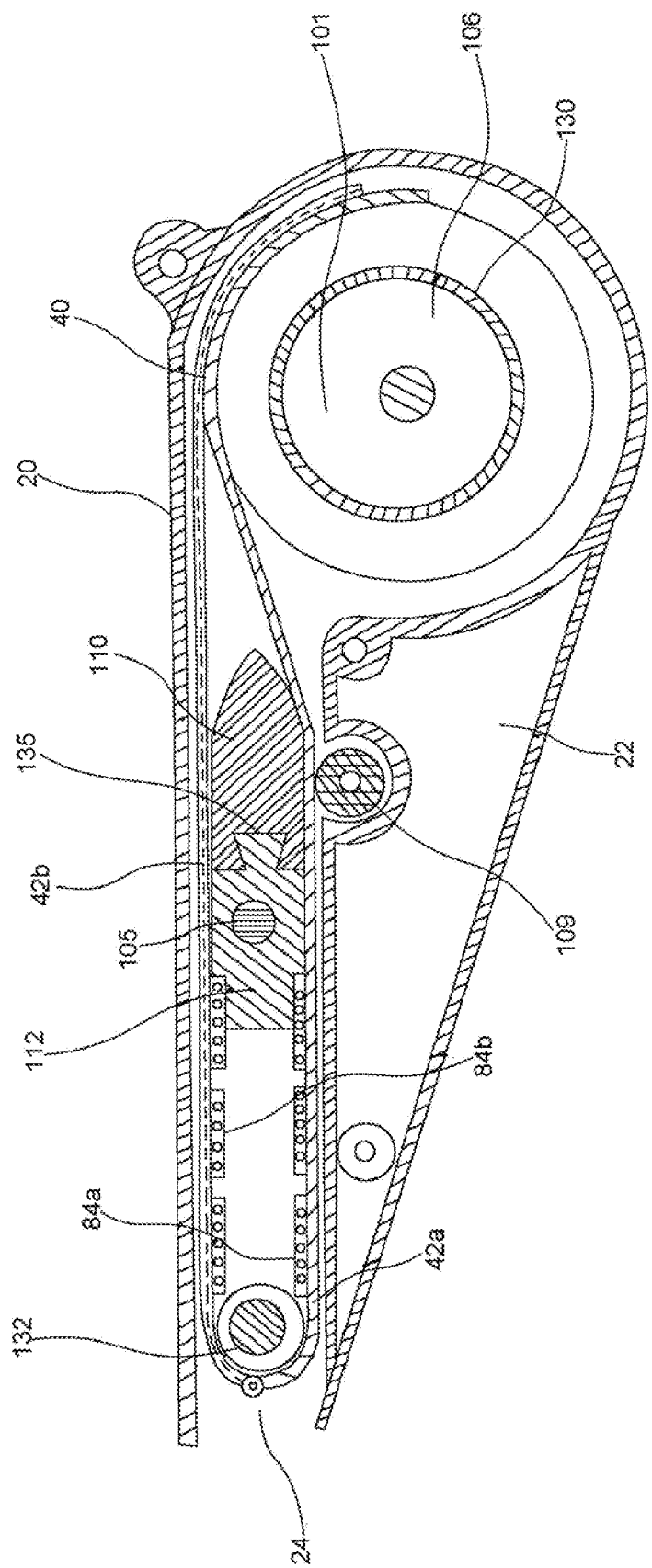
FIG. 13A is a sectional side view taken along line A-A1 of FIG. 2, showing the functional components of the device within the housing in a retracted position, according to an alternate embodiment of the present device.
Figure 13B:
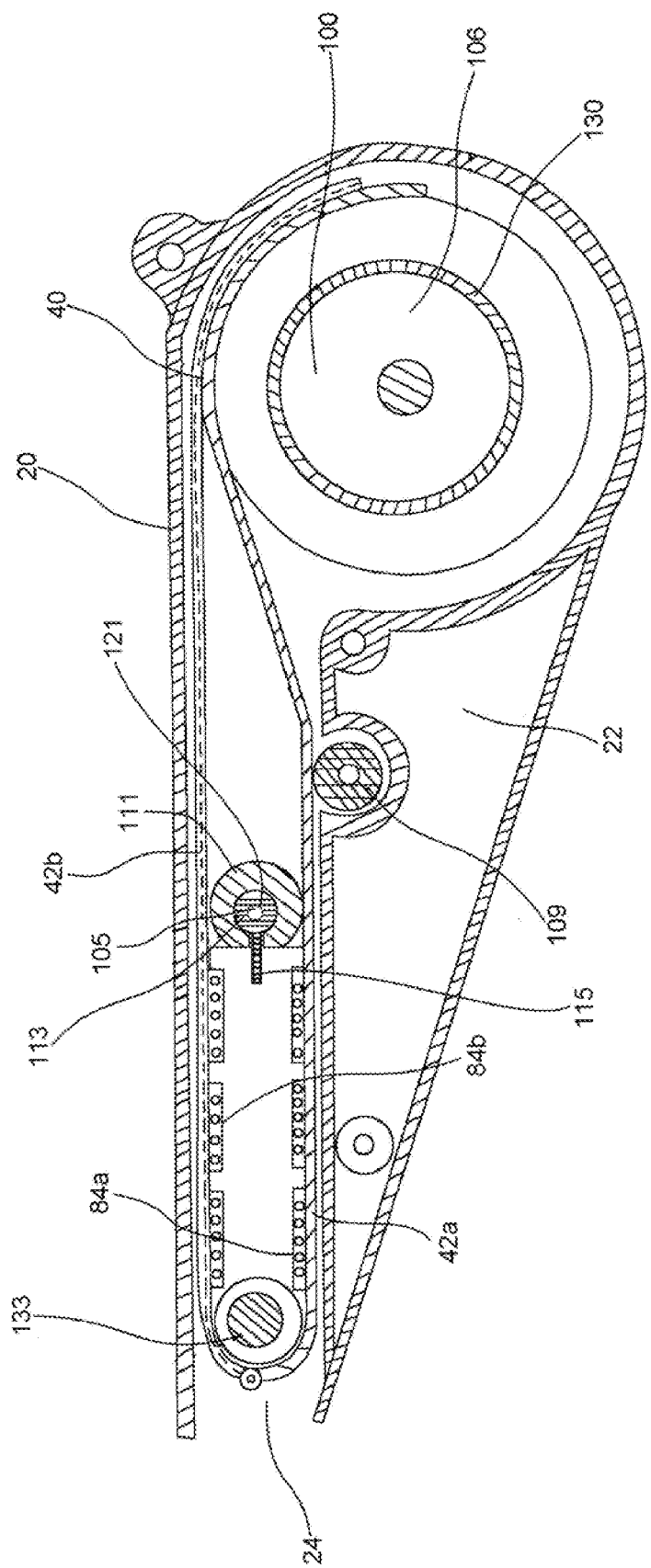
FIG. 13B is a sectional side view taken along line A-A1 of FIG. 2, showing the functional components of the device within the housing in a retracted position, according to a preferred embodiment of the present device.

Referring now to FIG. 8B, side cover plate 28b is shown, wherein side cover plate 28b functions as a protective cover and/or aesthetically pleasing enclosure for inner side plate 27 of housing 20. Inner side plate 27, as seen in FIG. 8A and also referred to and integrally performing as endwall 26b, is adapted with engagement berth 29 for roller 130, guide rail berth 31 for cylinder chamber 111 or alternate guide rail 110, threaded shaft berth 35 for threaded shaft 105, and zipper engagement port 33 for locking and/or unlocking of releasably-engageable peripheral edging 52. A similar side cover plate is preferably adapted and provided for similarly aesthetic coverage of endwall 26a.

Figure 4:
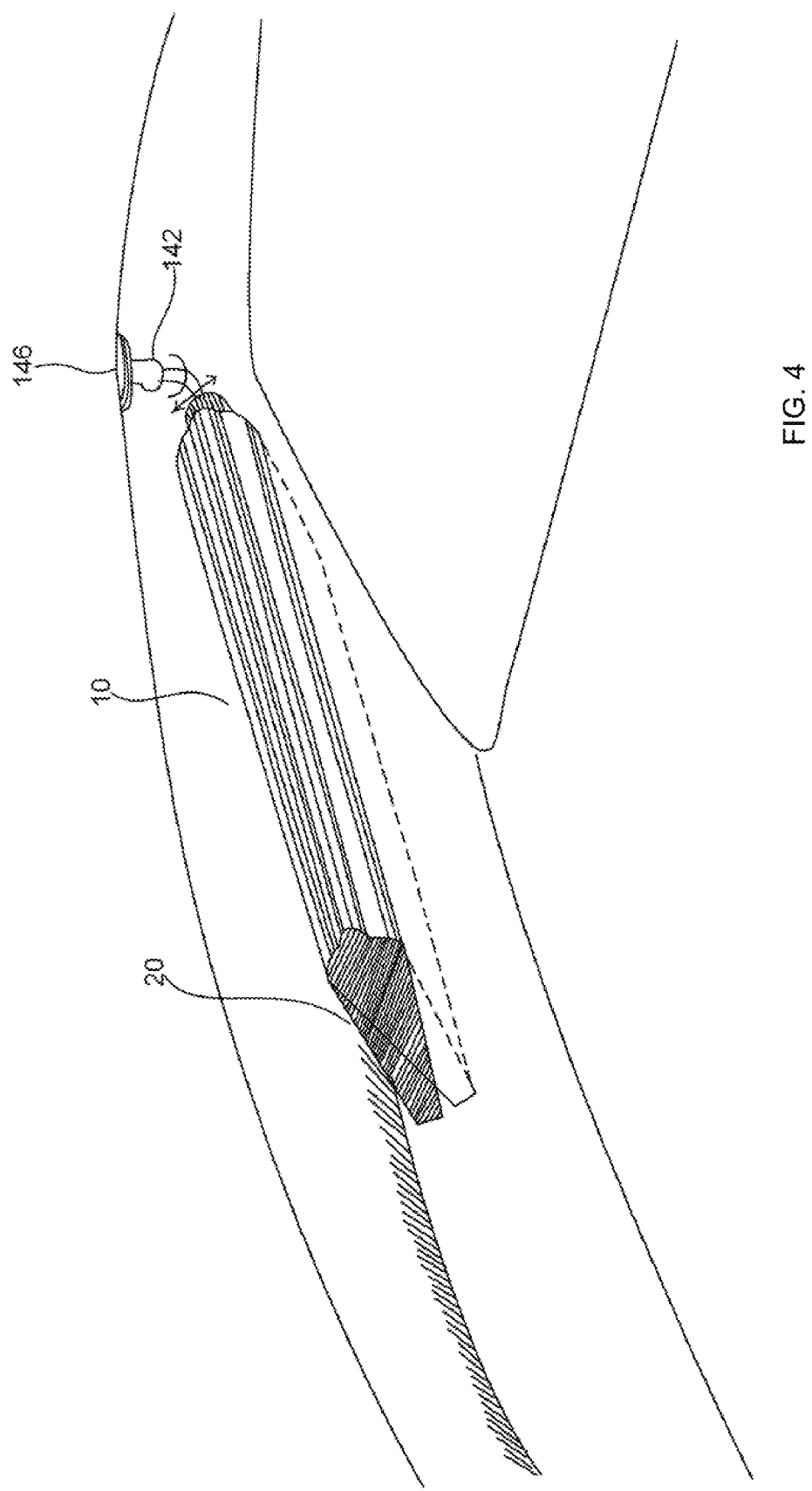
FIG. 4 is a perspective view of an automobile sun visor with electromechanical sun shade, installed via a ball-and-socket joint and selectable paths of motion thereof.

With particular reference now to FIGS. 4, 5A, and 5B, it is preferred that housing 20 further comprises spring 138, and cross support bar 140 extending the length of housing 20, proximate roller 130, and terminating in mount ball 142. Spring 138 allows adaptability of device 10 to essentially any curve of a window, and further serves a protective function, allowing for prevention of damage to support frame 80, such as from delivery of pulling force thereto, wherein spring 138 allows for reactionary movement of the entire device 10 housing 20 for redirection of such potentially damaging forces.

Preferably, device 10 further comprises compatible female socket mount 144, adapted with flush mount 146 for installation within a vehicle at a selected location, preferably proximate the inner roof headliner edge. In such manner, engagement of mount ball 142 within socket mount 144 preferably serves to support device 10, both while deployed and during periods of shade retraction, or non-use. During such periods of shade retraction, or non-use, device 10 may be utilized in traditional manner as a sun visor. Moreover, device 10 may be utilized as an improved sun visor, in non-traditional manner, with partial extension of shading 40 serving as an effective and adjustably located barrier within a moving vehicle. Therefore, device 10 may be retrofitted to essentially any vehicle, or may be installed during vehicle manufacture in addition to and/or in place of previously known sun visors.

Figure 3:
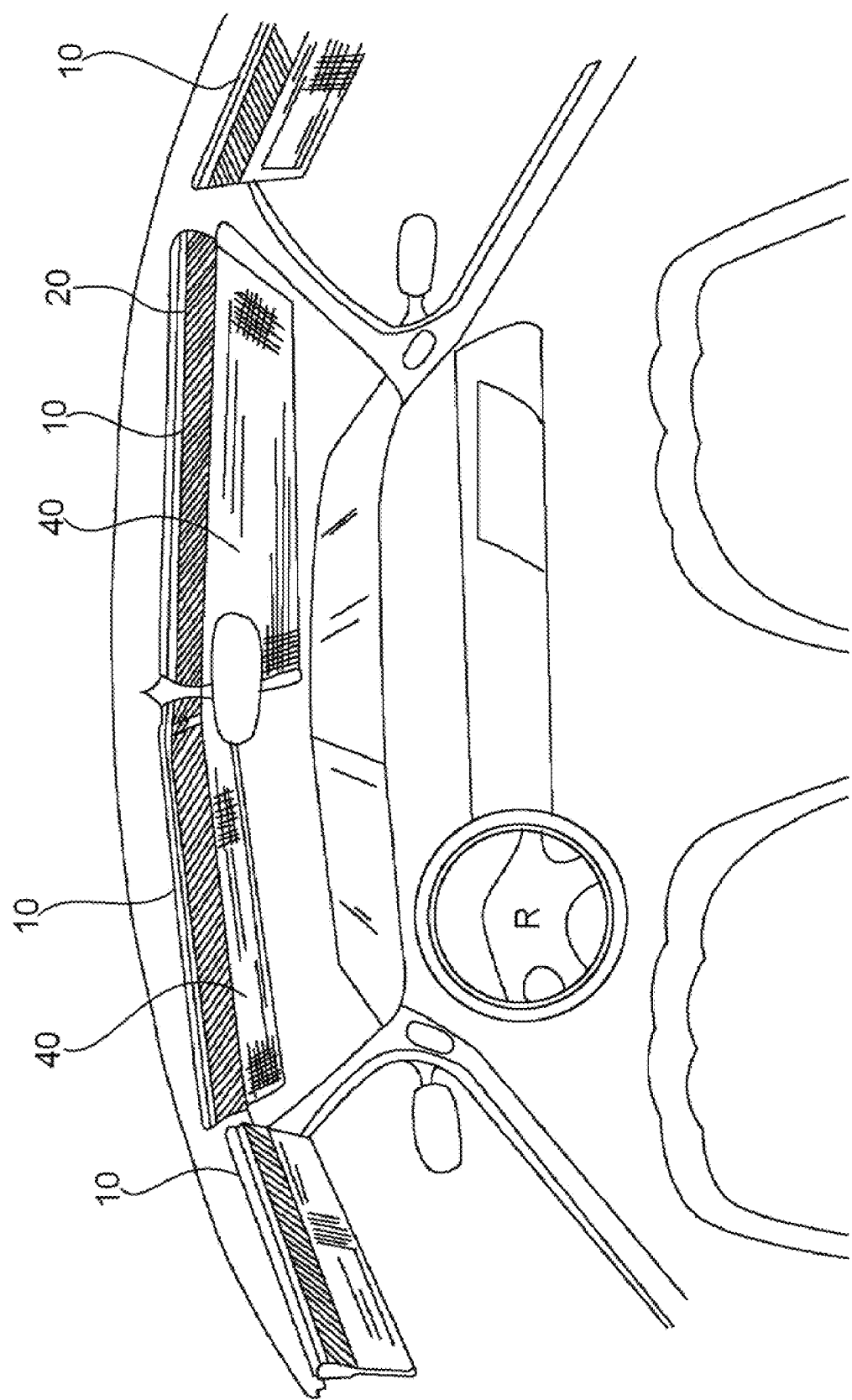
FIG. 3 is a perspective, environmental view of a plurality of sun visors, each installed in one of a plurality of selectable mounting arrangements.

Referring now to FIGS. 3 and 4, device 10 is preferably installed near an interior roof and headliner of a vehicle, proximate a window, and is preferably installed via ball-and-socket hinge 148, whereby enhanced range of motion for housing 20 via hinge 148 and spring 138 facilitates broad selection of orientation and use positioning. Additionally, this preferred installation orientation and positioning also facilitates the vertically downward deployment of device 10 relative to the orientation of a vehicle, in lieu of more limited and traditional horizontal deployment. In such manner, as discussed previously, length of expansion of support frame 80 may be adjusted according to window height variation, and side-by-side deployment is enabled without recognizable gap breach therebetween. Any other suitable mode of attachment, whether temporary or permanent, may alternately be utilized.

According to an alternate embodiment, motorized control system 102 and plurality of guide elements 104 may define alternate operational mechanism 101, comprising motor 106, drive train 108, rubber pulley support 109, threaded shaft 105, guide rail 110 and plurality of sliders 112, represented in FIGS. 1A, 7A, 11A, and 13A, however, it should be noted that motorized control system 102 could be installed on either end of housing 20. It should also be noted that relative to the description of this and any other alternate embodiments, features and elements similar to a preferred embodiment remain so numbered, with only changed or otherwise alternate elements renumbered. Additionally, drive train 108 could be any suitable structure, such as worm to worm gear, or helical to helical, without limitation. In this embodiment, arms 91 of support frame 80 are supported by guide rail 110 through engagement with plurality of sliders 112, wherein each crossing arm 91 of X-shaped stage 82 is secured to one slider 112, and wherein fixed slider 114b is secured proximate threaded shaft 105 and guide rail 110 and movable slider 114a is adapted for movement along threaded shaft 105 and guide rail 110. As will be further discussed herein below, it is the movement of movable slider 114a along threaded shaft 105, and in guide rail 110, relative to the fixed position of slider 114b, that enables the expansion and retraction of scissor-type mechanism 82 in response to movement of drive train 108, wherein extension may be exemplarily seen in FIG. 1A and retraction in FIG. 9.

Further, as exemplarily represented in FIGS. 14A, 14B, lengthwise trough 120 is defined in guide rail 110, wherein slider track 135 of each slider 112 engages within trough 120 in such manner that if the slider 112 is installed in a manner to allow movement along threaded shaft 105, that movement is restricted only to axial movement relative to the length of guide rail 110, and wherein the structural configuration of slider track 135, with a generally enlarged base segment 137, prevents disengagement of sliders 112 from trough 120 of guide rail 110. Further representation of this arrangement is depicted in the cross-sectional view of FIG. 13A.

In addition to the motorized control system 102 and guide elements 104 that are contained within housing 20, spring-loaded roller 130 extends, rotationally mounted, between endwalls 26a, 26b of housing 20, wherein layers 42a, 42b of screening 40 are supported therearound. That is, proximal end (not shown) of each screen layer 42a, 42b is secured to roller 130, with screen layer 42a passing between rubber pulley support 109 and guide rail 110, screen layer 42b passing over guide rail 110, and distal end 50 of each screen layer 42a, 42b secured to end rail 132, wherein rubber pulley support 109 may have any desirable number of support members. In such manner, exterior-facing shade panel 48b is deployed proximate layer 84b of support frame 80 and interior-facing shade panel 48a is deployed proximate layer 84a of support frame 80, in opposing positions relative to scissor-type mechanism 82.

According to this alternate embodiment, motor 106 is a stepper motor adapted for user-activation, such as via an on-board switch (not shown) and/or remote signal activator and receiver. As shown in FIG. 7A, motor 106 is housed within roller 130, in functional communication with drive train 108, wherein engagement of motor 106 in a first mode directs rotational movement of threaded shaft 105, such that the threaded nature of threaded shaft 105 engages internally threaded channel 116 of slider 114a, resulting in movement of slider 114a along guide rail 110 and from a generally central location within housing 20 toward an endwall 26a, 26b. In such manner, crossed arms 91 of X-shaped stage 82 are brought closer together by pivot action at central pivot point 88, and support 80 is extended. It should be noted that threaded shaft 105 is directionally subdivided, wherein a first half length is threaded left and a second half length is threaded right. In such manner, threaded shaft 105 is able to functionally accommodate movement of a dual, scissor-type extension mechanism 82, with a first movable slider 114a may move along threaded shaft 105 in a first direction and a second moveable slider 114a may move along threaded shaft 105 in a second direction, essentially moving apart from a generally central position along threaded shaft 105.

Moreover, the dual-scissor configuration results in strength enhancement, wherein the necessary movement of slider 114a is minimized such that the entire unit is consistently stable, with even pressure distribution and prevention and/or elimination of slack in screening 40. Of course, one skilled in the art should readily recognize that device 10 could alternately be configured with only one scissor configuration and/or could be configured wherein both sliders 114a and 114b were moveable, with resulting influence on performance. Even in an alternate design having a single scissor configuration, it should be noted that structural strength remains as a result of the multi-stage functionality.

Engagement of motor 106 in a second mode preferably directs movement of threaded shaft 105 in a rotationally opposite direction to that of the first mode, wherein movement of slider 114a along guide rail 110 is encouraged away from endwalls 26a, 26b, and wherein crossed arms 91 of X-shaped stage 82 are again distanced from one another by pivot action at central pivot point 88, and support 80 is retracted. It should be noted that any suitable motor 106 could alternately be utilized.

Referring now to FIG. 8B, side cover plate 28b is shown, wherein side cover plate 28b functions as a protective cover and/or aesthetically pleasing enclosure for inner side plate 27 of housing 20. Inner side plate 27, as seen in FIG. 8A and also referred to and integrally performing as endwall 26b, is adapted with engagement berth 29 for roller 130, guide rail berth 31 for guide rail 110, threaded shaft berth 35 for threaded shaft 105, and zipper engagement port 33 for locking and/or unlocking of releasably-engageable peripheral edging 52. A similar side cover plate is preferably adapted and provided for similarly aesthetic coverage of endwall 26a.

In a further alternate embodiment, device 10 could be configured without motor 106, wherein hand crank or similar member could be utilized to direct motion.

In another alternate embodiment, device 10 could be configured without guide rail 110, threaded shaft 105 and/or sliders 114a, 114b, and without cylinder chamber 111 and/or arm connections 113, wherein an alternate means for directing expansion of frame 80 could be utilized, such as, for exemplary purposes only, block and tackle. Moreover, in embodiments comprising sliders 112 and/or arm connections 113, alternate means for directing movement thereof could be utilized, such as, for exemplary purposes only, and without limitation, magnetic forces.

In a further alternate embodiment, roller 130 could be rotationally powered, either via motor 106 or via an alternate source, in lieu of or in addition to being spring-loaded.

In another alternate embodiment, device 10 could be constructed without roller pulley support 109, wherein because roller pulley support 109 serves to beneficially support guide rail 110 and screening 40, especially for units wherein housing 20 is of an especially elongated nature, device 10 could functionally operate and perform adequately even without roller pulley support 109, especially in shorter housing designs.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

We claim:

1. A vehicle sun visor device, comprising:
a housing with an interior compartment;
means for attaching said housing to a vehicle;
an extendable frame comprising one or more X-shaped stages and push rollers;
means for frame extension; and
a dual-layer screen, wherein a first layer of said screen is positioned to cover a first surface of said extendable frame and a second layer of said screen is positioned to cover a second, opposing surface of said extendable frame;
wherein extension of said frame coincidentally extends said dual-layer screen, wherein retraction of said frame coincidentally retracts said dual-layer screen by means of a spring-loaded roller, and wherein said retracted frame and screen are contained within said housing;
wherein said means for frame extension further comprises an elongate support member, one or more slidable members carried proximate said elongate support member, and a threaded shaft, wherein said extendable frame is pivotally secured to said one or more slidable members, and wherein at least one of said slidable members is internally threaded and moveable relative to an axial length of said elongate support member, according to rotation of said threaded shaft; and
a rubber pulley support member carried proximate said elongate support member, and wherein said rubber pulley support member, said threaded shaft, and said elongate support member extend from a first end to a second end of said housing.

2. The vehicle sun visor device of claim 1, wherein said housing is tear-shaped.

3. The vehicle sun visor device of claim 1, wherein said means for attaching said housing to a vehicle is a ball-and-socket joint and mount.

4. The vehicle sun visor device of claim 3, wherein said ball-and-socket joint and mount are spring-loaded.

5. The vehicle sun visor device of claim 1, further comprising one or more spring members positioned between said interconnected layers.

6. The vehicle sun visor device of claim 1, wherein said first layer of said screen and said second layer of said screen differ in appearance.

7. The vehicle sun visor device of claim 1, wherein said dual-layer screen further comprises means for reseal able engagement of said first layer and said second layer proximate a peripheral edge of each said layer.

8. The vehicle sun visor device of claim 7, wherein said means for releasable engagement is selected from the group consisting of a zipper, a slide lock, and hook and loop fastener.

9. The vehicle sun visor device of claim 1, wherein said inner compartment of said housing further comprises a lip, wherein said extendable frame receives support therefrom.

10. The vehicle sun visor of claim 1, wherein said one or more X-shaped stages comprise two interconnected layers.

11. The vehicle sun visor of claim 1, wherein said one or more X-shaped stages comprises two parallel units.

12. A sun visor, comprising:
a spring-loaded roller carried within a housing;
two screens with a proximal end wound around said spring-loaded roller and a distal end attached to plurality of push rollers;
a scissor-type support mechanism carried within said housing and extendable out of said housing through an opening therein, wherein said screens are carried on opposing surfaces of said support mechanism and said screens are unwound and extended coincident with extension of said support mechanism; and a screen engagement mechanism, wherein said mechanism secures a plurality of screen edges of said screens together upon exit from said housing.

13. The sun visor of claim 12, further comprising:
a motor;
a cylinder chamber with one or more fixed arm connectors and one or more slidable arm connectors, wherein a first stage of said scissor-type support mechanism is attached to one said fixed arm connector and one said slidable arm connector;
a threaded shaft, wherein said one or more slidable arm connectors is moveable thereon;
a drive train operatively connected between said motor and said threaded shaft, wherein a first mode of motor operation rotates said shaft and moves said one or more slidable arm connectors, contracting said scissor-type support mechanism and extending same, and wherein a second mode of motor operation rotates said threaded shaft in a direction opposite to that of said first mode and moves said one or more slidable arm connectors in a direction opposite that of said first mode, widening said scissor-type support mechanism and contracting same.

14. The sun visor of claim 13, wherein said cylinder chamber has a slit defined lengthwise, at least a portion of an axial length of said cylinder chamber.

15. The sun visor of claim 13, wherein said threaded shaft comprises two lengthwise segments of threading, and wherein said two lengthwise segments of threading are opposingly directed.

16. A vehicle sun visor device, comprising:
a housing with an interior compartment;
means for attaching said housing to a vehicle;
an extendable frame comprising one or more X-shaped stages and push rollers;
means for frame extension; and
a dual-layer screen, wherein a first layer of said screen is positioned to cover a first surface of said extendable frame and a second layer of said screen is positioned to cover a second, opposing surface of said extendable frame;
wherein extension of said frame coincidentally extends said dual-layer screen, wherein retraction of said frame coincidentally retracts said dual-layer screen by means of a spring-loaded roller, and wherein said retracted frame and screen are contained within said housing;
wherein said means for frame extension further comprises an elongate support member, one or more slidable members carried proximate said elongate support member, and a threaded shaft, wherein said extendable frame is pivotally secured to said one or more slidable members, and wherein at least one of said slidable members is internally threaded and moveable relative to an axial length of said elongate support member, according to a rotation of said threaded shaft; and
wherein said elongate support member has a lengthwise slit therein, a portion of each of said one or more of said slidable members is slidable within said slit, and a length of said slit is more than a length of said portion of each of said slidable members to facilitate lengthwise movement of each of said one or more of the slidable members in response to said rotation of said threaded shaft.

* * * * *